US012632726B2

(12) United States Patent　　　　　(10) Patent No.:　US 12,632,726 B2
Pisarenco et al.　　　　　　　　　　　　(45) Date of Patent:　　　May 19, 2026

(54) METHOD FOR INCREASING CERTAINTY IN PARAMETERIZED MODEL PREDICTIONS

(71) Applicant: ASML NETHERLANDS B.V., Veldhoven (NL)

(72) Inventors: Maxim Pisarenco, Son en Breugel (NL); Scott Anderson Middlebrooks, Duizel (NL); Coen Adrianus Verschuren, Eindhoven (NL)

(73) Assignee: ASML NETHERLANDS B.V., Veldhoven (NL)

( * ) Notice: Subject to any disclaimer, the term of this patent is extended or adjusted under 35 U.S.C. 154(b) by 929 days.

(21) Appl. No.: 17/639,609

(22) PCT Filed: Aug. 12, 2020

(86) PCT No.: PCT/EP2020/072593
§ 371 (c)(1),
(2) Date: Mar. 2, 2022

(87) PCT Pub. No.: WO2021/043551
PCT Pub. Date: Mar. 11, 2021

(65) Prior Publication Data
US 2022/0335290 A1　　　Oct. 20, 2022

(30) Foreign Application Priority Data

Sep. 6, 2019　(EP) ..................................... 19195954
Nov. 19, 2019　(EP) ..................................... 19210026
Jul. 29, 2020　(EP) ..................................... 20188310

(51) Int. Cl.
*G06N 3/08*　　　　(2023.01)
*G06N 3/045*　　　(2023.01)

(52) U.S. Cl.
CPC ............... *G06N 3/08* (2013.01); *G06N 3/045* (2023.01)

(58) Field of Classification Search
CPC ........ G06N 3/08; G06N 3/045; G06N 3/0454; G06N 3/0472; G06N 3/088; G03F 7/705
See application file for complete search history.

(56) References Cited

U.S. PATENT DOCUMENTS 5,229,872 A　　7/1993　Mumola
6,046,792 A　　4/2000　Van Der Werf et al.
(Continued)

FOREIGN PATENT DOCUMENTS

CN　　　103106331　　　5/2013
CN　　　108984822　　　12/2018
(Continued)

OTHER PUBLICATIONS

Tripathy, Rohit K., and Ilias Bilionis. "Deep UQ: Learning deep neural network surrogate models for high dimensional uncertainty quantification." Journal of computational physics 375 (2018): 565-588. (Year: 2018).*
Lin, Yibo, et al. "Data Efficient Lithography Modeling with Transfer Learning and Active Data Selection." arXiv preprint arXiv:1807.03257 (2018). (Year: 2018).*
(Continued)

*Primary Examiner* — Randall K. Baldwin
(74) *Attorney, Agent, or Firm* — Pillsbury Winthrop Shaw Pittman, LLP

(57)　　　　　ABSTRACT
A method for increasing certainty in parameterized model predictions. The method includes clustering dimensional data in a latent space associated with a parameterized model into clusters. Different clusters correspond to different portions of a given input. The method includes predicting, with the parameterized model, an output based on the dimensional data in the latent space. The method includes transforming, with the parameterized model, the dimensional data in the latent space into a recovered version of the given
(Continued)

input that corresponds to one or more of the clusters. In some embodiments, the method includes determining which one or more clusters correspond to predicted outputs with higher variance, and making the parameterized model more descriptive by adding to the dimensionality of the latent space, and/or training the parameterized model with more diverse training data associated with one or more determined clusters or parts thereof associated with predicted outputs with the higher variance.

20 Claims, 11 Drawing Sheets

(56) References Cited

U.S. PATENT DOCUMENTS

| | | | |
|---|---|---|---|
| 7,587,704 B2 | 9/2009 | Ye et al. | |
| 8,200,468 B2 | 6/2012 | Ye et al. | |
| 8,245,160 B2 | 8/2012 | Ye et al. | |
| 8,930,172 B2 | 1/2015 | Ye et al. | |
| 9,588,439 B1 | 3/2017 | Bruguier et al. | |
| 2007/0031745 A1 | 2/2007 | Ye et al. | |
| 2007/0050749 A1 | 3/2007 | Ye et al. | |
| 2008/0301620 A1 | 12/2008 | Ye et al. | |
| 2008/0309897 A1 | 12/2008 | Wong et al. | |
| 2009/0157630 A1 | 6/2009 | Yuan | |
| 2010/0162197 A1 | 6/2010 | Ye et al. | |
| 2010/0180251 A1 | 7/2010 | Ye et al. | |
| 2017/0017738 A1 | 1/2017 | Dirks et al. | |
| 2018/0204111 A1 | 7/2018 | Zadeh et al. | |
| 2019/0026631 A1 | 1/2019 | Carr et al. | |
| 2020/0361083 A1* | 11/2020 | Mousavian | G06N 3/063 |
| 2020/0401916 A1* | 12/2020 | Rolfe | G06N 3/0455 |

FOREIGN PATENT DOCUMENTS

| | | |
|---|---|---|
| JP | 4395047 | 10/2009 |
| KR | 20190001608 | 1/2019 |
| TW | 1606312 | 11/2017 |
| TW | 1609283 | 12/2017 |

OTHER PUBLICATIONS

Atkinson, Steven, and Nicholas Zabaras. "Structured Bayesian Gaussian process latent variable model: Applications to data-driven dimensionality reduction and high-dimensional inversion." Journal of Computational Physics 383 (Jan. 2019): 166-195. (Year: 2019).*

Krebs, Julian, et al. "Learning a Probabilistic Model for Diffeomorphic Registration." IEEE transactions on medical imaging 38.9 (Aug. 2019): 2165-2176. (Year: 2019).*

Han, Xian-Feng, Hamid Laga, and Mohammed Bennamoun. "Image-based 3D Object Reconstruction: State-of-the-Art and Trends in the Deep Learning Era." arXiv preprint arXiv:1906.06543 (Jun. 2019). (Year: 2019).*

Office Action issued in corresponding Korean Patent Application No. 10-2022-7007614, dated Apr. 10, 2025.

International Search Report and Written Opinion issued in corresponding PCT Patent Application No. PCT/EP2020/072593, dated Nov. 6, 2020.

Taiwanese Office Action issued in corresponding Taiwanese Patent Application No. 109129693, dated Jul. 14, 2021.

Kingma, D.P. et al.: "Auto-Encoding Variational Bayes," arXiv:1312.6114 (2014).

Jiang, J. et.al: "When to Learn What: Deep Cognitive Subspace Clustering", Proceedings of the 26th ACM International Conference on Multimedia, pp. 718-726 (Oct. 2018).

Xie, J. et al.: "Unsupervised Deep Embedding for Clustering Analysis", Proceedings of the 33$^{rd}$ International Conference on Machine Learning, vol. 48 (2016).

Guo, X. et al.: "Deep Clustering with Convolutional Autoencoders", International Conference on Neural Information Processing (ICONIP), Part II, LNCS 10635, pp. 373-382 (2017).

Yang, H et al: "Multiscale Feature-Clustering-Based Fully Convolutional Autoencoder for Fast Accurate Visual Inspection of Texture Surface Defects", IEEE Transactions on Automation Science and Engineering, vol. 16, No. 3, pp. 1450-1467 (Jul. 2019).

Aytekin, C. et al.: "Clustering and Unsupervised Anomaly Detection with L2 Normalized Deep Auto-Encoder Representations", 2018 International Joint Conference on Neural Networks (IJCNN), IEEE, pp. 1-6 (Jul. 2018).

Du, S. et al: "Iterative Autoencoding and Clustering for Unsupervised Feature Representation", 2019 IEEE International Symposium on Circuits and Systems (ISCAS), IEEE, pp. 1-5 (May 26, 2019).

Chen, K. et al: "Skip The Question You Don't Know: An Embedding Space Approach", 2019 International Joint Conference on Neural Networks (IJCNN), IEEE, pp. 1-7 (Jul. 14, 2019).

* cited by examiner

400

408

405

406

410

404

411

402

403

METHOD FOR INCREASING CERTAINTY IN PARAMETERIZED MODEL PREDICTIONS

CROSS-REFERENCE TO RELATED APPLICATIONS

This application is the U.S. national phase entry of PCT Patent Application No. PCT/EP2020/072593 which was filed on Aug. 12, 2020, which claims the benefit of priority of European Patent Application No. 19195954.3 which was filed on Sep. 6, 2019 and of European Patent Application No. 19210026.1 which was filed on Nov. 19, 2019 and of European Patent Application No. 20188310.5 which was filed on Jul. 29, 2020 which are incorporated herein in their entireties by reference.

TECHNICAL FIELD

This description relates to an apparatus and a method for increasing certainty in parameterized model predictions.

BACKGROUND

A lithographic projection apparatus can be used, for example, in the manufacture of integrated circuits (ICs). In such a case, a patterning device (e.g., a mask) may contain or provide a pattern corresponding to an individual layer of the IC ("design layout"), and this pattern can be transferred onto a target portion (e.g. comprising one or more dies) on a substrate (e.g., silicon wafer) that has been coated with a layer of radiation-sensitive material ("resist"), by methods such as irradiating the target portion through the pattern on the patterning device. In general, a single substrate contains a plurality of adjacent target portions to which the pattern is transferred successively by the lithographic projection apparatus, one target portion at a time. In one type of lithographic projection apparatus, the pattern on the entire patterning device is transferred onto one target portion in one operation. Such an apparatus is commonly referred to as a stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the pattern on the patterning device are transferred to one target portion progressively. Since, in general, the lithographic projection apparatus will have a reduction ratio M (e.g., 4), the speed F at which the substrate is moved will be 1/M times that at which the projection beam scans the patterning device. More information with regard to lithographic devices as described herein can be gleaned, for example, from U.S. Pat. No. 6,046,792, incorporated herein by reference.

Prior to transferring the pattern from the patterning device to the substrate, the substrate may undergo various procedures, such as priming, resist coating and a soft bake. After exposure, the substrate may be subjected to other procedures ("post-exposure procedures"), such as a post-exposure bake (PEB), development, a hard bake and measurement/inspection of the transferred pattern. This array of procedures is used as a basis to make an individual layer of a device, e.g., an IC. The substrate may then undergo various processes such as etching, ion-implantation (doping), metallization, oxidation, chemo-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

Thus, manufacturing devices, such as semiconductor devices, typically involves processing a substrate (e.g., a semiconductor wafer) using a number of fabrication processes to form various features and multiple layers of the devices. Such layers and features are typically manufactured and processed using, e.g., deposition, lithography, etch, chemical-mechanical polishing, and ion implantation. Multiple devices may be fabricated on a plurality of dies on a substrate and then separated into individual devices. This device manufacturing process may be considered a patterning process. A patterning process involves a patterning step, such as optical and/or nanoimprint lithography using a patterning device in a lithographic apparatus, to transfer a pattern on the patterning device to a substrate and typically, but optionally, involves one or more related pattern processing steps, such as resist development by a development apparatus, baking of the substrate using a bake tool, etching using the pattern using an etch apparatus, etc. One or more metrology processes are typically involved in the patterning process.

As noted, lithography is a central step in the manufacturing of device such as ICs, where patterns formed on substrates define functional elements of the devices, such as microprocessors, memory chips, etc. Similar lithographic techniques are also used in the formation of flat panel displays, micro-electro mechanical systems (MEMS) and other devices.

As semiconductor manufacturing processes continue to advance, the dimensions of functional elements have continually been reduced while the number of functional elements, such as transistors, per device has been steadily increasing over decades, following a trend commonly referred to as "Moore's law". At the current state of technology, layers of devices are manufactured using lithographic projection apparatuses that project a design layout onto a substrate using illumination from a deep-ultraviolet illumination source, creating individual functional elements having dimensions well below 100 nm, i.e. less than half the wavelength of the radiation from the illumination source (e.g., a 193 nm illumination source).

This process in which features with dimensions smaller than the classical resolution limit of a lithographic projection apparatus are printed, is commonly known as low-$k_1$ lithography, according to the resolution formula $CD=k_1 \times \lambda/NA$, where $\lambda$ is the wavelength of radiation employed (currently in most cases 248 nm or 193 nm), NA is the numerical aperture of projection optics in the lithographic projection apparatus, CD is the "critical dimension"—generally the smallest feature size printed—and $k_1$ is an empirical resolution factor. In general, the smaller $k_1$ the more difficult it becomes to reproduce a pattern on the substrate that resembles the shape and dimensions planned by a designer in order to achieve particular electrical functionality and performance. To overcome these difficulties, sophisticated fine-tuning steps are applied to the lithographic projection apparatus, the design layout, or the patterning device. These include, for example, but not limited to, optimization of NA and optical coherence settings, customized illumination schemes, use of phase shifting patterning devices, optical proximity correction (OPC, sometimes also referred to as "optical and process correction") in the design layout, or other methods generally defined as "resolution enhancement techniques" (RET). The term "projection optics" as used herein should be broadly interpreted as encompassing various types of optical systems, including refractive optics, reflective optics, apertures and catadioptric optics, for example. The term "projection optics" may also include components operating according to any of these design types for directing, shaping or controlling the projection beam of radiation, collectively or singularly. The term "projection optics" may include any optical component in the lithographic projection apparatus, no matter where the optical component is located on an optical path of the lithographic projection apparatus. Projection optics may include optical components for shaping, adjusting and/or projecting radiation from the source before the radiation passes the patterning device, and/or optical components for shaping, adjusting and/or projecting the radiation after the radiation passes the patterning device. The projection optics generally exclude the source and the patterning device.

SUMMARY

According to an embodiment, there is provided a method for making parameterized model predictions. The method comprises clustering, with a parameterized model, dimensional data in a latent space associated with the parameterized model into clusters. Different clusters correspond to different portions of a given input. The method comprises predicting, with the parameterized model, an output based on the dimensional data in the latent space. The method comprises transforming, with the parameterized model, the dimensional data in the latent space into a recovered version of the given input that corresponds to one or more of the clusters.

In some embodiments, the predicting and the transforming is simultaneous.

In some embodiments, the dimensional data in the latent space is transformed into the recovered version of the given input to facilitate visualization of points of interest in the latent space.

In some embodiments, the method further comprises identifying the points of interest in the latent space.

In some embodiments, the points of interest comprise one or more of points with relatively high variance or uncertainty compared to other points in the latent space, points that are not located within a cluster, or points located at a cartesian distance that is relatively far from one or more other points and/or clusters in the latent space compared to cartesian distances between other points and/or clusters in the latent space.

In some embodiments, the method comprises using the points of interest, the clusters, the recovered version of the given input, and/or the output to evaluate performance of the parameterized model.

In some embodiments, the method comprises transforming, with the parameterized model, higher dimensional data associated with the given input into the dimensional data in the latent space.

In some embodiments, the parameterized model is a machine learning model. In some embodiments, the parameterized model comprises encoder-decoder architecture. In some embodiments, the encoder-decoder architecture comprises variational encoder-decoder architecture, and the method comprises training the variational encoder-decoder architecture with a probabilistic latent space, which generates realizations in an output space.

In some embodiments, the latent space comprises low dimensional encodings.

In some embodiments, the dimensional data in the latent space is encoded by an encoder of the encoder-decoder architecture.

In some embodiments, the output is predicted based on the dimensional data in the latent space with a first portion of the encoder-decoder architecture. In some embodiments, the first portion of the encoder-decoder architecture is a first decoder. In some embodiments, the dimensional data in the latent space is transformed into the recovered version of the given input by a second decoder of the encoder-decoder architecture.

In some embodiments, the given input comprises one or more of an image, a clip, an encoded image, an encoded clip, or data from a prior layer of the parameterized model, associated with a semiconductor manufacturing process. In some embodiments, the given input is associated with a target pattern design, defects, or process parameters for the semiconductor manufacturing process. In some embodiments, the output comprises a predicted mask image, a probability of defects, or predicted process parameters for the semiconductor manufacturing process.

In some embodiments, the method comprises adjusting the parameterized model based on the clusters, the output, and/or the recovered version of the input. In some embodiments, the adjusting may be configured to enhance agreement between one or more portions of the output and one or more portions of a ground truth.

In some embodiments, adjusting the parameterized model comprises making the parameterized model more descriptive by adding to a dimensionality of the latent space, and/or training the parameterized model with more diverse training data associated with one or more of the clusters.

In some embodiments, making the parameterized model more descriptive by adding to the dimensionality of the latent space, or training the parameterized model with more diverse training data associated with one or more of the clusters, comprises: using more diverse images, more diverse data, and additional clips related to one or more of the clusters, relative to prior training material, as input to train the parameterized model; and/or using more dimensions for encoding vectors, and more encoding layers in the parameterized model.

In some embodiments, the more diverse training samples comprise additional and/or more diverse images, additional and/or more diverse data, and additional and/or more diverse clips relative to prior training material.

In some embodiments, the method further comprises determining which clusters, or parts of clusters, of the dimensional data in the latent space correspond to predicted outputs with higher variance compared to other clusters, or other parts of clusters, of the dimensional data.

In some embodiments, determining which clusters, or parts of clusters, of the dimensional data in the latent space correspond to predicted outputs with higher variance facilitates selection of additional training data.

In some embodiments, the method comprises making the parameterized model more descriptive by adding to the dimensionality of the latent space, and/or training the parameterized model with more diverse training data associated with one or more of the determined clusters or parts of clusters associated with the higher variance.

In some embodiments, the method further comprises adjusting the parameterized model based on the clusters, the output, and/or the recovered version of the given input to increase the certainty of the parameterized model for predicting substrate geometry as part of a semiconductor manufacturing process.

In some embodiments, the method comprises adjusting the parameterized model based on the clusters, the output, and/or the recovered version of the given input to increase the certainty of the parameterized model for predicting a continuous tone mask (CTM) as part of a semiconductor manufacturing process.

In some embodiments, the method further comprises training the parameterized model. The training comprises sampling the dimensional data in the latent space and for each sample in the latent space: predicting multiple output realizations to generate a distribution of output realizations for given dimensional data in the latent space; and determining an uncertainty associated with the distribution of the multiple output realizations. The parameterized model is trained based on the given dimensional data and the determined uncertainty (e.g., a separate parameterized model may be trained using the given dimensional data and the determined uncertainty, and the output from that second model may be used to guide the training of the first parameterized model).

In some embodiments, the given dimensional data and corresponding uncertainties form input output training pairs. In some embodiments, the parameterized model comprises a neural network, and wherein training the parameterized model with the given dimensional data and the corresponding uncertainties comprises providing the input output training pairs to the neural network so the neural network can learn to predict new output realizations.

In some embodiments, the method comprises using the trained parameterized model for predicting mask or reticle geometry as part of a semiconductor manufacturing process.

According to another embodiment, there is provided a method for training a parameterized model. The method comprises sampling dimensional data in a latent space and for each sample in the latent space: predicting multiple output realizations to generate a distribution of output realizations for given dimensional data in the latent space; and determining an uncertainty associated with the distribution of the multiple output realizations. The parameterized model is trained with the given dimensional data and the determined uncertainty. (This may be the second parameterized model discussed above, and/or other models, for example).

In some embodiments, the parameterized model is a machine learning model.

In some embodiments, the parameterized model comprises a neural network.

In some embodiments, the parameterized model comprises encoder-decoder architecture.

In some embodiments, encoder architecture comprises a portion of the parameterized model configured to transform model inputs into the dimensional data in the latent space, and decoder architecture comprises a different portion of the parameterized model configured to transform the dimensional data in the latent space into the output realizations.

In some embodiments, the encoder architecture and the decoder architecture comprise one or more neural networks having one or more layers with one or more nodes.

In some embodiments, the method further comprises transforming, with the portion of the parameterized model, higher dimensional data associated with the model inputs into the dimensional data in the latent space, the dimensional data in the latent space comprising lower dimensional data compared to the higher dimensional data associated with the model inputs.

In some embodiments, the model inputs comprise one or more of an image, a clip, an encoded image, an encoded clip, or data from a prior layer of the parameterized model, associated with a semiconductor manufacturing process.

In some embodiments, the model inputs are associated with a target pattern design, defects, or process parameters for a semiconductor manufacturing process.

In some embodiments, the dimensional data in the latent space comprises multi-dimensional vectors associated with model inputs.

In some embodiments, the multiple output realizations comprise predicted mask images, defect probabilities, or predicted process parameters for a semiconductor manufacturing process.

In some embodiments, the predicting comprises decoding, with one or more layers and/or one or more nodes of a neural network, a multi-dimensional vector of the dimensional data into an output realization.

In some embodiments, determining the uncertainty comprises determining a variance of the predicted multiple output realizations.

In some embodiments, determining the variance comprises determining a range, a standard deviation, a maximum, a minimum, an average, a median, and/or a mode of the predicted multiple output realizations.

In some embodiments, the predicted multiple output realizations comprise images, and determining the uncertainty comprises determining a metric indicative of differences between the images.

In some embodiments, the given dimensional data and corresponding uncertainties form input output training pairs.

In some embodiments, the parameterized model comprises a neural network, and training the parameterized model with the given dimensional data and the corresponding uncertainties comprises providing the input output training pairs to the neural network so the neural network can learn to predict new output realizations.

In some embodiments, the method further comprises determining which portions of the dimensional data in the latent space correspond to predicted output realizations with higher variance compared to other portions of the dimensional data and sampling from the portions that correspond to higher variance.

In some embodiments, determining which portions of the dimensional data in the latent space correspond to predicted output realizations with higher variance facilitates selection of additional training data.

In some embodiments, the method further comprises using the trained parameterized model for predicting mask or reticle geometry as part of a semiconductor manufacturing process.

In some embodiments, the method further comprises using the trained parameterized model for predicting a continuous tone mask (CTM) as part of a semiconductor manufacturing process.

According to another embodiment, there is provided a method for determining adjustments to semiconductor manufacturing process parameters. The method comprises clustering, with a parameterized model, dimensional data in a latent space associated with the parameterized model into clusters. Different clusters correspond to different portions of a given input. The method comprises predicting, with the parameterized model, an output based on the dimensional data in the latent space. The method comprises transforming, with the parameterized model, the dimensional data in the latent space into a recovered version of the given input that corresponds to one or more of the clusters. The method comprises adjusting, based on the clusters, the output, and/or the recovered version of the given input, one or more parameters of the parameterized model to increase certainty of the parameterized model predictions. The method comprises determining adjustments to one or more semiconductor manufacturing process parameters based on predictions from the adjusted parameterized model.

In some embodiments, the method comprises adjusting the parameterized model based on the clusters, the output, and/or the recovered version of the given input to increase the certainty of the parameterized model for predicting a continuous tone mask (CTM) as part of the semiconductor manufacturing process.

In some embodiments, the one or more determined semiconductor manufacturing process parameters comprise one or more of a mask design, a pupil shape, a dose, or a focus.

In some embodiments, the one or more determined semiconductor manufacturing process parameters comprise the mask design. In some embodiments, determining adjustments to the one or more semiconductor manufacturing process parameters comprises changing the mask design from a first mask design to a second mask design.

In some embodiments, the given input comprises one or more of an image, a clip, an encoded image, an encoded clip, or data from a prior layer of the parameterized model.

According to another embodiment, there is provided a non-transitory computer readable media having instructions thereon, the instructions when executed by a computer implementing any of the methods described above.

According to another embodiment, there is provided a method for increasing certainty of parameterized model predictions. The method comprises: clustering, with a parameterized model, dimensional data in a latent space associated with the parameterized model into clusters, wherein different clusters correspond to different portions of a given input; predicting, with the parameterized model, an output based on the dimensional data in the latent space; transforming, with the parameterized model, the dimensional data in the latent space into a recovered version of a given input that corresponds to one or more of the clusters; and adjusting, based on the clusters, the output, and/or the recovered version of the given input, one or more parameters of the parameterized model to increase certainty of the parameterized model predictions.

In some embodiments, the method further comprises determining which clusters, or parts of clusters, of the dimensional data in the latent space correspond to predicted outputs with higher variance compared to other clusters, or other parts of clusters, of the dimensional data.

In some embodiments, determining which clusters, or parts of clusters, of the dimensional data in the latent space correspond to predicted outputs with higher variance facilitates selection of additional training data.

In some embodiments, adjusting comprises making the parameterized model more descriptive by adding to the dimensionality of the latent space, and/or training the parameterized model with more diverse training data associated with one or more of the determined clusters or parts of clusters associated with the higher variance.

In some embodiments, making the parameterized model more descriptive by adding to the dimensionality of the latent space, and/or training the parameterized model with more diverse training data associated with one or more of the determined clusters or parts of clusters associated with the higher variance, comprises: using more diverse images and more diverse data related to one or more of the clusters, relative to prior training material, as input to train the parameterized model; and/or using more dimensions for encoding vectors, and more encoding layers in the parameterized model.

In some embodiments, the method further comprises training the parameterized model. The training comprises sampling the dimensional data in the latent space and for each sample in the latent space: predicting multiple output realizations to generate a distribution of output realizations for given dimensional data in the latent space; and determining an uncertainty associated with the distribution of the multiple output realizations. The parameterized model is trained based on the given dimensional data and the determined uncertainty.

In some embodiments, the method further comprises determining which clusters of the dimensional data in the latent space correspond to predicted output realizations with higher variance compared to other clusters of the dimensional data and sampling from the clusters that correspond to higher variance.

In some embodiments, individual clusters in the latent space correspond to different encoded patterns in the dimensional data.

In some embodiments, adjusting the one or more parameters of the parameterized model comprises determining separate per-pattern information that indicates which pattern types are well known to the parameterized model and result in comparatively consistent predictions, and which pattern types are unfamiliar to the parameterized mode and result in comparatively variable predictions.

In some embodiments, the separate per-pattern information comprises variance, latent space coverage, and/or a distribution.

In some embodiments, adjusting the one or more parameters of the parameterized model comprises adjusting a dimensionality of the parameterized model and/or weights of one or more layers of the parameterized model.

In some embodiments, the method further comprises adjusting the parameterized model based on the clusters, the output, and/or the recovered version of the input to decrease a variance of the parameterized model predictions and/or enhance the parameterized model predictions for new patterns.

In some embodiments, the method further comprises identifying points of interest in the latent space, wherein the points of interest comprise one or more of points with relatively high variance or uncertainty compared to other points in the latent space, points that are not located within a cluster, or points located at a cartesian distance that is relatively far from one or more other points and/or clusters in the latent space compared to cartesian distances between other points and/or other clusters in the latent space; and using the points of interest, the clusters, the recovered version of the given input, and/or the output to evaluate performance of the parameterized model.

In some embodiments, the parameterized model comprises variational encoder-decoder architecture. The dimensional data in the latent space is encoded by an encoder of the encoder-decoder architecture. The output is predicted based on the dimensional data in the latent space with a decoder of the encoder-decoder architecture, and the dimensional data in the latent space is transformed into the recovered version of the given input by a second decoder of the encoder-decoder architecture. The method further comprises training the variational encoder-decoder architecture with a probabilistic latent space, which generates realizations in an output space.

According to another embodiment, there is provided non-transitory computer readable media having instructions thereon, the instructions when executed by a computer implementing any of the methods described herein.

BRIEF DESCRIPTION OF THE DRAWINGS

The accompanying drawings, which are incorporated in and constitute a part of the specification, illustrate one or more embodiments and, together with the description, explain these embodiments. Embodiments of the invention will now be described, by way of example only, with reference to the accompanying schematic drawings in which corresponding reference symbols indicate corresponding parts, and in which.

DETAILED DESCRIPTION

Figure 1:
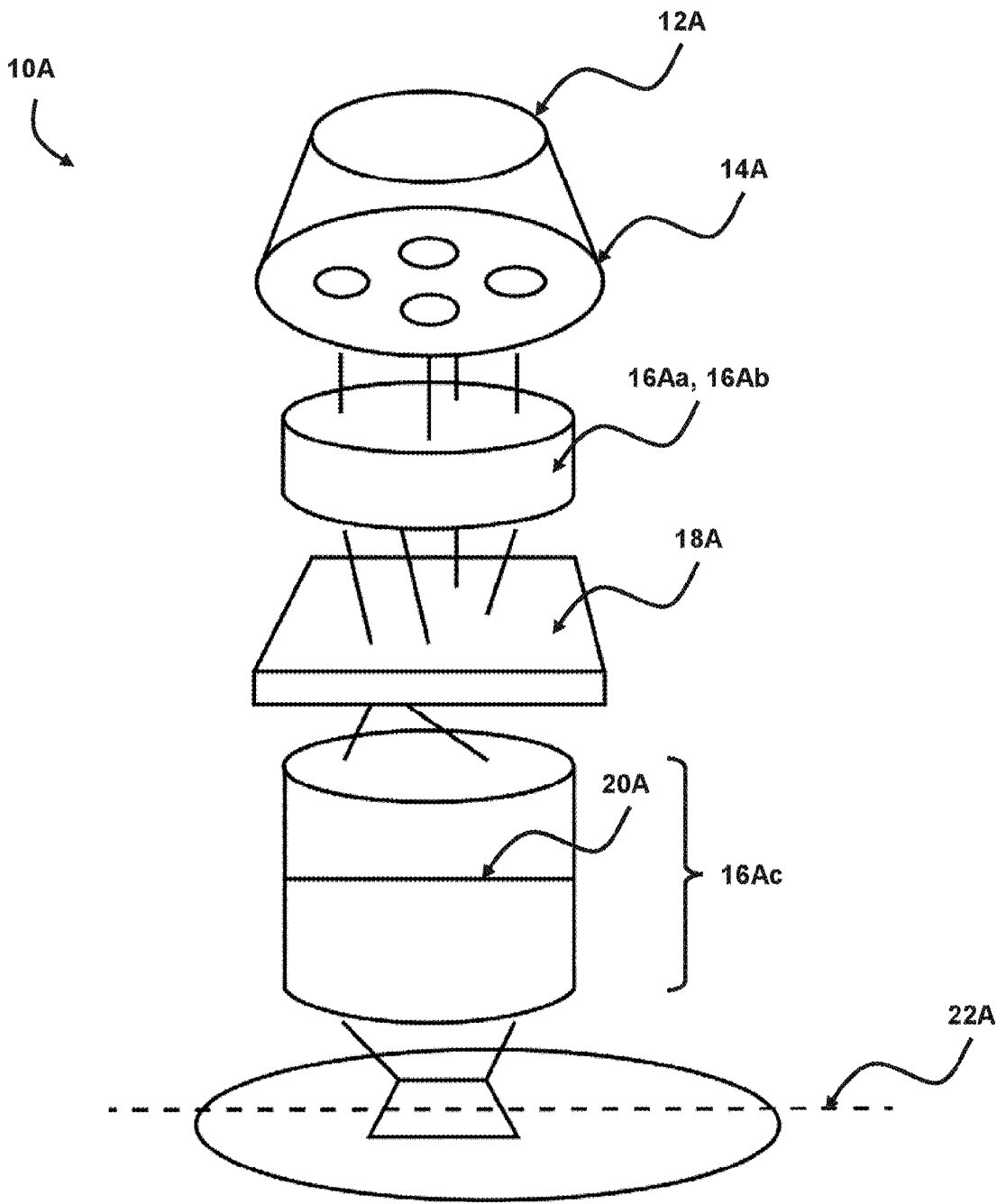
FIG. 1 shows a block diagram of various subsystems of a lithography system, according to an embodiment.

Parameterized models (e.g., machine learning models such as variational auto encoders and/or other parameterized models) rely on training. To limit training time and associated cost, the data set used for training such models should have maximum data diversity with minimum size. Until now, there was no good way to optimize data selected for training Instead, training data was randomly sampled from a larger data set, until a predefined cost function metric was reached. Electronic model predictions were typically compared to expensive physical models. For example, prior sub resolution assist feature (SRAF) models (as just one example) are typically trained to predict a continuous transmission mask (CTM) from a target design using these expensive physical models. The performance of prior models is often evaluated using validation data sets comprising target/physical substrate (e.g., physical CTM mask) image pairs. Validation procedures like this provide a global indication of the performance of a trained parameterized model, but do not provide a breakdown of model prediction accuracy according to the type of pattern encountered during training.

The present system(s) and method(s) are configured to improve the training of parameterized models by searching for training data comprising patterns, for example, associated with higher uncertainty in model predictions. The present system(s) and methods are configured to determine an enhanced set of inputs (e.g., patterns) for training a model to improve its prediction performance, instead of relying on random or other training data selection methods. The present system(s) and method(s) are configured to increase certainty in parameterized model predictions using the described training data selection operations.

The present system(s) and method(s) leverage the low dimensionality and compactness of a latent space of a parameterized model (e.g., a variational encoder-decoder) to perform (e.g., pattern) clustering (e.g., for encoded patterns) directly in the latent space. This facilitates determination of pattern by pattern (or cluster by cluster) information. Advantageously, a compact and disentangled latent space leads to a natural separation of pattern clusters. By determining separate per-pattern information (e.g., statistics such as variance, latent space coverage, per-cluster distribution, etc.) the present system(s) and method(s) provide information on pattern types that are well known to a parameterized model (e.g., resulting in consistent predictions) and pattern types that are relatively unfamiliar (e.g., cause widely variable predictions). In addition, this pattern clustering requires virtually no additional computational resources, since it is considerably cheaper than the typical training process for a parameterized model.

In some embodiments, training the model may include sampling dimensional data in a latent space and for each sample in the latent space: predicting multiple output realizations to generate a distribution of output realizations for given dimensional data in the latent space; and determining an uncertainty associated with the distribution of the multiple output realizations. This sampling and predicting of the uncertainty may be performed with a completely separate parameterized model, for example, a sub portion of the encoder/decoder model described above (e.g., that may or may not include encoder/decoder architecture), and/or other models. The separate parameterized model may then be trained (or re-trained) with the given dimensional data and the determined uncertainty. Output from the separate parameterized model may be used to guide the training of the (first) model, for example. This is further described below.

Although specific reference may be made in this text to the manufacturing of semiconductors and/or ICs, it should be explicitly understood that the description herein has many other possible applications. For example, it may be employed outside of the field of semiconductor manufacturing, wherever predictive parameterized models are used. It may be employed in the manufacture of integrated optical systems, guidance and detection patterns for magnetic domain memories, liquid-crystal display panels, thin-film magnetic heads, etc. In some of these alternative applications, the skilled artisan will appreciate that, in the context of such alternative applications, any use of the terms "reticle", "wafer" or "die" in this text should be considered as interchangeable with the more general terms "mask", "substrate" and "target portion", respectively. In addition, it should be noted that the method described herein may have many other possible applications in diverse fields such as language processing systems, self-driving cars, medical imaging and diagnosis, semantic segmentation, denoising, chip design, electronic design automation, etc. The present method may be applied in any fields where quantifying uncertainty in machine learning model predictions is advantageous.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

A patterning device may comprise, or may form, one or more design layouts. The design layout may be generated utilizing CAD (computer-aided design) programs. This process is often referred to as EDA (electronic design automation). Most CAD programs follow a set of predetermined design rules in order to create functional design layouts/patterning devices. These rules are set based processing and design limitations. For example, design rules define the space tolerance between devices (such as gates, capacitors, etc.) or interconnect lines, to ensure that the devices or lines do not interact with one another in an undesirable way. One or more of the design rule limitations may be referred to as a "critical dimension" (CD). A critical dimension of a device can be defined as the smallest width of a line or hole, or the smallest space between two lines or two holes. Thus, the CD regulates the overall size and density of the designed device. One of the goals in device fabrication is to faithfully reproduce the original design intent on the substrate (via the patterning device).

The term "mask" or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective; binary, phase-shifting, hybrid, etc.), examples of other such patterning devices include a programmable mirror array. An example of such a device is a matrix-addressable surface having a viscoelastic control layer and a reflective surface. The basic principle behind such an apparatus is that (for example) addressed areas of the reflective surface reflect incident radiation as diffracted radiation, whereas unaddressed areas reflect incident radiation as undiffracted radiation. Using an appropriate filter, the said undiffracted radiation can be filtered out of the reflected beam, leaving only the diffracted radiation behind; in this manner, the beam becomes patterned according to the addressing pattern of the matrix-addressable surface. The required matrix addressing can be performed using suitable electronic means. Examples of other such patterning devices also include a programmable LCD array. An example of such a construction is given in U.S. Pat. No. 5,229,872, which is incorporated herein by reference.

As a brief introduction, FIG. 1 illustrates an exemplary lithographic projection apparatus 10A. Major components are a radiation source 12A, which may be a deep-ultraviolet (DUV) excimer laser source or other type of source including an extreme ultra violet (EUV) source (as discussed above, the lithographic projection apparatus itself need not have the radiation source), illumination optics which, for example, define the partial coherence (denoted as sigma) and which may include optics components 14A, 16Aa and 16Ab that shape radiation from the source 12A; a patterning device 18A; and transmission optics 16Ac that project an image of the patterning device pattern onto a substrate plane 22A. An adjustable filter or aperture 20A at the pupil plane of the projection optics may restrict the range of beam angles that impinge on the substrate plane 22A, where the largest possible angle defines the numerical aperture of the projection optics $NA=n \sin(\Theta_{max})$, wherein n is the refractive index of the media between the substrate and the last element of the projection optics, and $\Theta_{max}$ is the largest angle of the beam exiting from the projection optics that can still impinge on the substrate plane 22A.

In a lithographic projection apparatus, a source provides illumination (i.e. radiation) to a patterning device and projection optics direct and shape the illumination, via the patterning device, onto a substrate. The projection optics may include at least some of the components 14A, 16Aa, 16Ab and 16Ac. An aerial image (AI) is the radiation intensity distribution at substrate level. A resist model can be used to calculate the resist image from the aerial image, an example of which can be found in U.S. Patent Application Publication No. US 2009-0157630, the disclosure of which is hereby incorporated by reference in its entirety. The resist model is related only to properties of the resist layer (e.g., effects of chemical processes that occur during exposure, post-exposure bake (PEB) and development). Optical properties of the lithographic projection apparatus (e.g., properties of the illumination, the patterning device and the projection optics) dictate the aerial image and can be defined in an optical model. Since the patterning device used in the lithographic projection apparatus can be changed, it is desirable to separate the optical properties of the patterning device from the optical properties of the rest of the lithographic projection apparatus including at least the source and the projection optics. Details of techniques and models used to transform a design layout into various lithographic images (e.g., an aerial image, a resist image, etc.), apply OPC using those techniques and models and evaluate performance (e.g., in terms of process window) are described in U.S. Patent Application Publication Nos. US 2008-0301620, 2007-0050749, 2007-0031745, 2008-0309897, 2010-0162197, and 2010-0180251, the disclosure of each being hereby incorporated by reference in its entirety.

One aspect of understanding a lithographic process is understanding the interaction of the radiation and the patterning device. The electromagnetic field of the radiation after the radiation passes the patterning device may be determined from the electromagnetic field of the radiation before the radiation reaches the patterning device and a function that characterizes the interaction. This function may be referred to as the mask transmission function (which can be used to describe the interaction by a transmissive patterning device and/or a reflective patterning device).

The mask transmission function may have a variety of different forms. One form is binary. A binary mask transmission function has either of two values (e.g., zero and a positive constant) at any given location on the patterning device. A mask transmission function in the binary form may be referred to as a binary mask. Another form is continuous. Namely, the modulus of the transmittance (or reflectance) of the patterning device is a continuous function of the location on the patterning device. The phase of the transmittance (or reflectance) may also be a continuous function of the location on the patterning device. A mask transmission function in the continuous form may be referred to as a continuous tone mask or a continuous transmission mask (CTM). For example, the CTM may be represented as a pixelated image, where each pixel may be assigned a value between 0 and 1 (e.g., 0.1, 0.2, 0.3, etc.) instead of binary value of either 0 or 1. In some embodiments, CTM may be a pixelated gray scale image, with each pixel having values (e.g., within a range [−255, 255], normalized values within a range [0, 1] or [−1, 1] or other appropriate ranges).

The thin-mask approximation, also called the Kirchhoff boundary condition, is widely used to simplify the determination of the interaction of the radiation and the patterning device. The thin-mask approximation assumes that the thickness of the structures on the patterning device is very small compared with the wavelength and that the widths of the structures on the mask are very large compared with the wavelength. Therefore, the thin-mask approximation assumes the electromagnetic field after the patterning device is the multiplication of the incident electromagnetic field with the mask transmission function. However, as lithographic processes use radiation of shorter and shorter wavelengths, and the structures on the patterning device become smaller and smaller, the assumption of the thin-mask approximation can break down. For example, interaction of the radiation with the structures (e.g., edges between the top surface and a sidewall) because of their finite thicknesses ("mask 3D effect" or "M3D") may become significant. Encompassing this scattering in the mask transmission function may enable the mask transmission function to better capture the interaction of the radiation with the patterning device. A mask transmission function under the thin-mask approximation may be referred to as a thin-mask transmission function. A mask transmission function encompassing M3D may be referred to as a M3D mask transmission function.

It is often desirable to be able computationally determine how a patterning process would produce a desired pattern on a substrate. Thus, simulations may be provided to simulate one or more parts of the process. For example, it is desirable to be able to simulate the lithography process of transferring the patterning device pattern onto a resist layer of a substrate as well as the yielded pattern in that resist layer after development of the resist.

Figure 2:
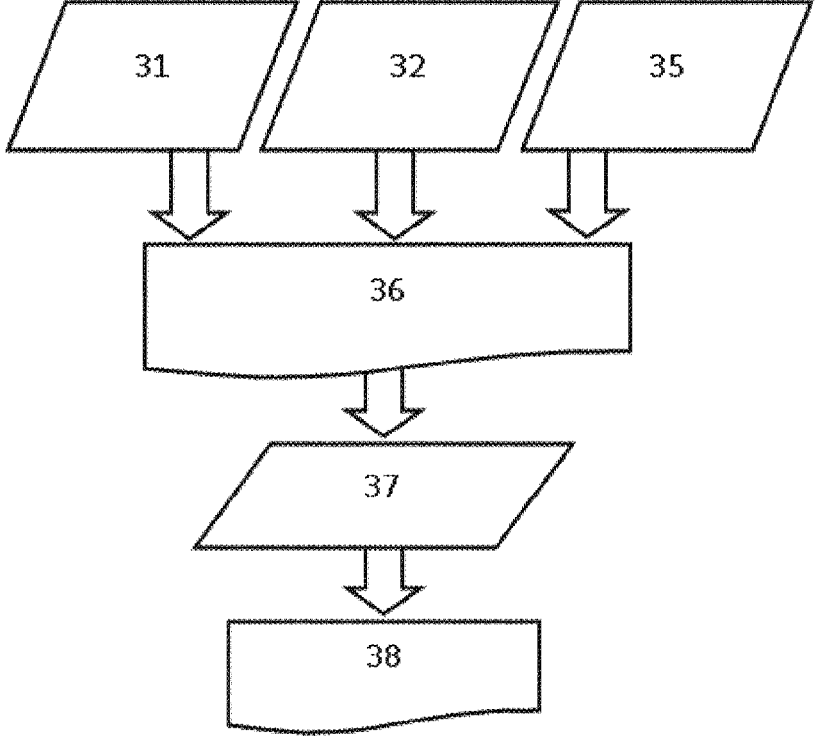
FIG. 2 illustrates an exemplary flow chart for simulating lithography in a lithographic projection apparatus, according to an embodiment.

An exemplary flow chart for simulating lithography in a lithographic projection apparatus is illustrated in FIG. 2. An illumination model 31 represents optical characteristics (including radiation intensity distribution and/or phase distribution) of the illumination. A projection optics model 32 represents optical characteristics (including changes to the radiation intensity distribution and/or the phase distribution caused by the projection optics) of the projection optics. A design layout model 35 represents optical characteristics (including changes to the radiation intensity distribution and/or the phase distribution caused by a given design layout) of a design layout, which is the representation of an arrangement of features on or formed by a patterning device. An aerial image 36 can be simulated using the illumination model 31, the projection optics model 32, and the design layout model 35. A resist image 38 can be simulated from the aerial image 36 using a resist model 37. Mask images, such as a CTM mask and/or other masks, may also be simulated (e.g., by the design layout model 35 and/or other models), for example. Simulation of lithography can, for example, predict contours and/or CDs in the resist image.

More specifically, illumination model 31 can represent the optical characteristics of the illumination that include, but are not limited to, NA-sigma (σ) settings as well as any particular illumination shape (e.g. off-axis illumination such as annular, quadrupole, dipole, etc.). The projection optics model 32 can represent the optical characteristics of the of the projection optics, including, for example, aberration, distortion, a refractive index, a physical size or dimension, etc. The design layout model 35 can also represent one or more physical properties of a physical patterning device, as described, for example, in U.S. Pat. No. 7,587,704, which is incorporated by reference in its entirety. Optical properties associated with the lithographic projection apparatus (e.g., properties of the illumination, the patterning device and the projection optics) dictate the aerial image. Since the patterning device used in the lithographic projection apparatus can be changed, it is desirable to separate the optical properties of the patterning device from the optical properties of the rest of the lithographic projection apparatus including at least the illumination and the projection optics (hence design layout model 35).

The resist model 37 can be used to calculate the resist image from the aerial image, an example of which can be found in U.S. Pat. No. 8,200,468, which is hereby incorporated by reference in its entirety. The resist model is typically related to properties of the resist layer (e.g., effects of chemical processes which occur during exposure, post-exposure bake and/or development).

The objective of the simulation is to accurately predict, for example, edge placements, aerial image intensity slopes, sub resolution assist features (SRAF), and/or CDs, which can then be compared against an intended or target design. The intended design is generally defined as a pre-OPC design layout which can be provided in a standardized digital file format such as GDSII, OASIS or another file format.

From the design layout, one or more portions may be identified, which are referred to as "clips". In some embodiments, a set of clips is extracted, which represents the complicated patterns in the design layout (typically about 50 to 1000 clips, although any number of clips may be used). As will be appreciated by those skilled in the art, these patterns or clips represent small portions (e.g., circuits, cells, etc.) of the design and especially the clips represent small portions for which particular attention and/or verification is needed. In other words, clips may be the portions of the design layout or may be similar or have a similar behavior of portions of the design layout where critical features are identified either by experience (including clips provided by a customer), by trial and error, or by running a full-chip simulation. Clips often contain one or more test patterns or gauge patterns. An initial larger set of clips may be provided a priori by a customer based on known critical feature areas in a design layout which require particular image optimization. Alternatively, in another embodiment, the initial larger set of clips may be extracted from the entire design layout by using some kind of automated (such as, machine vision) or manual algorithm that identifies the critical feature areas.

For example, the simulation and modeling can be used to configure one or more features of the patterning device pattern (e.g., performing optical proximity correction), one or more features of the illumination (e.g., changing one or more characteristics of a spatial/angular intensity distribution of the illumination, such as change a shape), and/or one or more features of the projection optics (e.g., numerical aperture, etc.). Such configuration can be generally referred to as, respectively, mask optimization, source optimization, and projection optimization. Such optimization can be performed on their own, or combined in different combinations. One such example is source-mask optimization (SMO), which involves the configuring of one or more features of the patterning device pattern together with one or more features of the illumination. The optimization techniques may focus on one or more of the clips. The optimizations may use the machine learning model described herein to predict values of various parameters (including images, etc.).

In some embodiments, an optimization process of a system may be represented as a cost function. The optimization process may comprise finding a set of parameters (design variables, process variables, etc.) of the system that minimizes the cost function. The cost function can have any suitable form depending on the goal of the optimization. For example, the cost function can be weighted root mean square (RMS) of deviations of certain characteristics (evaluation points) of the system with respect to the intended values (e.g., ideal values) of these characteristics. The cost function can also be the maximum of these deviations (i.e., worst deviation). The term "evaluation points" should be interpreted broadly to include any characteristics of the system or fabrication method. The design and/or process variables of the system can be confined to finite ranges and/or be interdependent due to practicalities of implementations of the system and/or method. In the case of a lithographic projection apparatus, the constraints are often associated with physical properties and characteristics of the hardware such as tunable ranges, and/or patterning device manufacturability design rules. The evaluation points can include physical points on a resist image on a substrate, as well as non-physical characteristics such as dose and focus, for example.

In some embodiments, illumination model 31, projection optics model 32, design layout model 35, resist model 37, an SMO model, and/or other models associated with and/or included in an integrated circuit manufacturing process may be an empirical model that performs the operations of the method described herein. The empirical model may predict outputs based on correlations between various inputs (e.g., one or more characteristics of a mask or wafer image, one or more characteristics of a design layout, one or more characteristics of the patterning device, one or more characteristics of the illumination used in the lithographic process such as the wavelength, etc.).

As an example, the empirical model may be a machine learning model and/or any other parameterized model. In some embodiments, the machine learning model (for example) may be and/or include mathematical equations, algorithms, plots, charts, networks (e.g., neural networks), and/or other tools and machine learning model components. For example, the machine learning model may be and/or include one or more neural networks having an input layer, an output layer, and one or more intermediate or hidden layers. In some embodiments, the one or more neural networks may be and/or include deep neural networks (e.g., neural networks that have one or more intermediate or hidden layers between the input and output layers).

As an example, the one or more neural networks may be based on a large collection of neural units (or artificial neurons). The one or more neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function that combines the values of all its inputs together. In some embodiments, each connection (or the neural unit itself) may have a threshold function such that a signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, the one or more neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for the one or more neural networks may be freer flowing, with connections interacting in a more chaotic and complex fashion. In some embodiments, the intermediate layers of the one or more neural networks include one or more convolutional layers, one or more recurrent layers, and/or other layers.

The one or more neural networks may be trained (i.e., whose parameters are determined) using a set of training data (e.g., ground truths). The training data may include a set of training samples. Each sample may be a pair comprising an input object (typically a vector, which may be called a feature vector) and a desired output value (also called the supervisory signal). A training algorithm analyzes the training data and adjusts the behavior of the neural network by adjusting the parameters (e.g., weights of one or more layers) of the neural network based on the training data. For example, given a set of N training samples of the form $\{(x_1,y_1), (x_2,y_2), \ldots, (x_N,y_N)\}$ such that $x_i$ is the feature vector of the i-th example and $y_i$ is its supervisory signal, a training algorithm seeks a neural network $g: X \rightarrow Y$, where X is the input space and Y is the output space. A feature vector is an n-dimensional vector of numerical features that represent some object (e.g., a wafer design as in the example above, a clip, etc.). The vector space associated with these vectors is often called the feature or latent space. After training, the neural network may be used for making predictions using new samples.

As described above, the present method(s) and system(s) include a parameterized model (e.g., a machine learning model such as a neural network) that uses a variational encoder-decoder architecture. In the middle (e.g., middle layers) of the model (e.g., a neural network), the present model formulates a low-dimensional encoding (e.g., latent space) that encapsulates information in an input (e.g., an image, a tensor, or other input associated with a pattern or other features of a semiconductor manufacturing process) to the model. The present system(s) and method(s) leverage the low dimensionality and compactness of the latent space to perform pattern clustering directly in the latent space. This facilitates determination of pattern (cluster) by pattern information. Advantageously, a compact and disentangled latent space leads to a natural separation of pattern clusters. By determining separate per-pattern information (e.g., statistics such as variance, latent space coverage, per-cluster distribution, etc.) the present system(s) and method(s) provide information on pattern types that are well known to a parameterized model (e.g., resulting in consistent predictions) and pattern types that are relatively unfamiliar (e.g., cause widely variable predictions).

The present system(s) and method(s) are configured to improve the training of parameterized models by actively searching for training data comprising patterns (for example) associated with higher uncertainty in model predictions. The present system(s) and methods are configured to determine an enhanced set of inputs (e.g., patterns) to use for training based on the inputs (patterns) that cause higher uncertainty. Retraining or further training the model with this enhanced set of input patterns improves the model's prediction performance. The model does not have to rely on random or other data selection methods for training data.

The present system(s) and method(s) are configured to increase certainty in parameterized model predictions using the described training data selection operations. By repeating the process of latent space clustering, identifying clusters and/or patterns associated with higher prediction uncertainty, and retraining the model with these or related patterns, training will be much more effective than when training samples are, for example, randomly chosen.

It should be noted that even though a machine learning model, a neural network, and/or encoder-decoder architecture are mentioned throughout this specification, a machine learning model, a neural network, and encoder-decoder architecture are just examples, and the operations described herein may be applied to different parameterized models.

Figure 3:
FIG. 3 illustrates a summary of operations of a present method for increasing certainty in parameterized model predictions, according to an embodiment.
Figure 3:
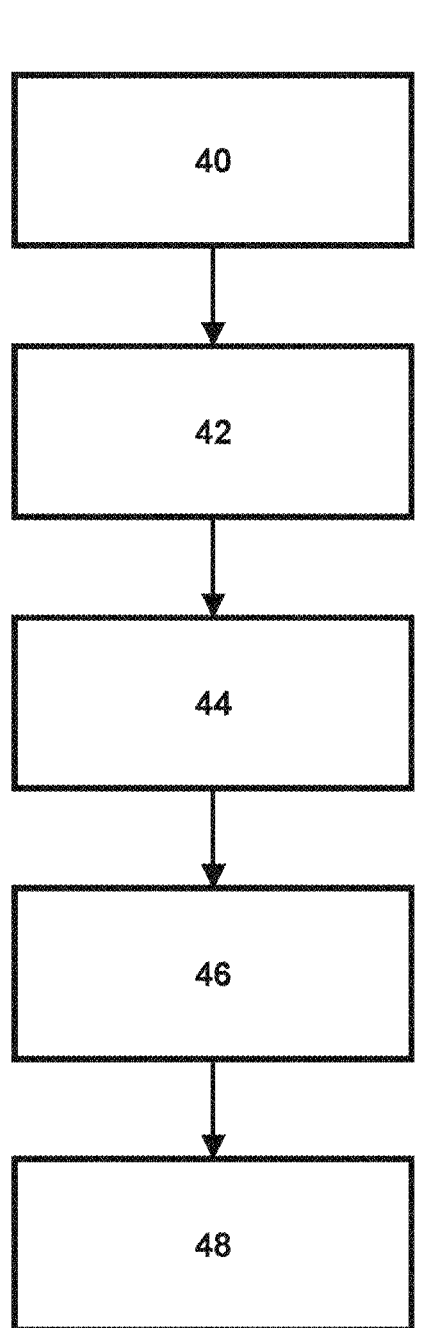

FIG. 3 illustrates a summary 300 of operations of one embodiment of the present method for increasing certainty in parameterized model predictions. At an operation 40, higher dimensional data associated with a given input may be transformed into lower dimensional data in a latent space with a parameterized model. At an operation 42, dimensional data in the latent space is clustered into clusters by the model. Different clusters correspond to different portions of the given input. At an operation 44, the model predicts an output based on the dimensional data in the latent space. At an operation 46, the dimensional data in the latent space is transformed by the model into a recovered version of the given input that corresponds to one or more of the clusters. In some embodiments, transforming may include encoding or decoding, projecting, mapping, and/or other transformation operations. In some embodiments, the predicting (operation 44) and the transforming (operation 46) are simultaneous or nearly simultaneous. At an operation 48, the model is retrained, further trained, and/or otherwise adjusted based on the clusters, the output, and/or the recovered version of the given input to increase certainty of the parameterized model's predictions.

In some embodiments, as described herein, the parameterized model is a machine learning model. In some embodiments, the parameterized model comprises encoder-decoder architecture. In an embodiment, the encoder-decoder architecture comprises variational encoder-decoder architecture, and operation 40 and/or other operations comprise training the variational encoder-decoder architecture with a probabilistic latent space, which generates realizations in an output space. The latent space comprises low dimensional encodings and/or other information (as described herein). A latent space is probabilistic if it is formed by sampling from a distribution (such as Gaussian) given the parameters of the distribution (such as mu and sigma) computed by the encoder.

Figure 4:
FIG. 4 illustrates an example of a parameterized model comprising a variational autoencoder, according to an embodiment.

FIG. 4 illustrates an example of a parameterized model 400. Model 400 may be a variational autoencoder, for example. Variational autoencoders can use an encoder or encoder network 402 to encode inputs 403 (images, text, signals, etc. associated with patterns and/or other inputs) into a continuous representation, also called latent space 404, and a decoder or decoder network 406 to generate a corresponding output 405 (predicted images, text, signals, numerical value, etc. representative of a pattern and/or other features). Training of both networks 402, 406 is performed using input object/output value pairs (e.g., as described above). In some embodiments, model 400 may be fully trained. In these embodiments, operations 40-48 described in FIG. 3 may be configured to improve model 400 by determining which types of patterns cause more uncertainty in predictions made by model 400. In some embodiments, model 400 may be partially trained. In these embodiments, operations 40-48 may facilitate at least partial training of model 400 including forming latent space 404. As shown in FIG. 4, model 400 includes two different decoders 408 and 410, or portions of decoder network 406 that function similar to a decoder (as described below), in decoder network 406. In some embodiments, decoder 410 is configured to invert the encoding (mapping) of encoder or encoder network 402 such that an output (e.g., recovered version 411 described below) resembles input 403.

Returning to FIG. 3, in operation 40, the transforming (e.g., encoding, projecting, mapping, etc.) may be performed by an encoder (e.g., encoder or encoder network 402 shown in FIG. 4) of the machine learning (parameterized) model encoder-decoder architecture, for example. A given input may comprise, for example, an image, a clip, an encoded image, an encoded clip, a vector, data from a prior layer of the machine learning model, text, signals, other data associated with a semiconductor manufacturing process, and/or any other data and/or object that may be encoded. In some embodiments, the given input is associated with a target pattern design, defects, or process parameters for the semiconductor manufacturing process, for example.

In some embodiments, a low dimensional encoding represents one or more features of an input (e.g., an image). The one or more features of the input may be considered key or critical features of the input. Features may be considered key or critical features of an input because they are relatively more predictive than other features of a desired output and/or have other characteristics, for example. The one or more features (dimensions) represented in the low dimensional encoding may be predetermined (e.g., by a programmer at the creation of the present machine learning model), determined by prior layers of the neural network, adjusted by a user via a user interface associated with a system described herein, and/or may be determined in by other methods. In some embodiments, a quantity of features (dimensions) represented by the low dimensional encoding may be predetermined (e.g., by the programmer at the creation of the present machine learning model), determined based on output from prior layers of the neural network, adjusted by the user via the user interface associated with a system described herein, and/or determined by other methods.

A dimension (feature) may be used to categorize a fact, a variable, a property, a degree of freedom, a type, and/or other features of an input. Dimensional data may be data having a number of facts, variables, a number of degrees of freedom, a number of types, and/or other features. The facts, variables, degrees of freedom, types, etc. of the data may be the "dimensions" of the data. Dimensional data may have various forms, including a vector form (e.g., multi-dimensional vectors). In some embodiments, the dimensional data in the latent space comprises multi-dimensional vectors associated with model input, and/or other information. By way of a non-limiting example, a model input may comprise an image. The image may have a relatively high number of dimensions (features). For example, the image may have a size, quantities of pixels of different colors and/or in different locations, and/or other dimensions. The dimensional data in the latent space may have a relatively lower number of dimensions (features). For example, the dimensional data in the latent space may comprise a multi-dimensional vector that represents the key features of the input image.

Figure 5:
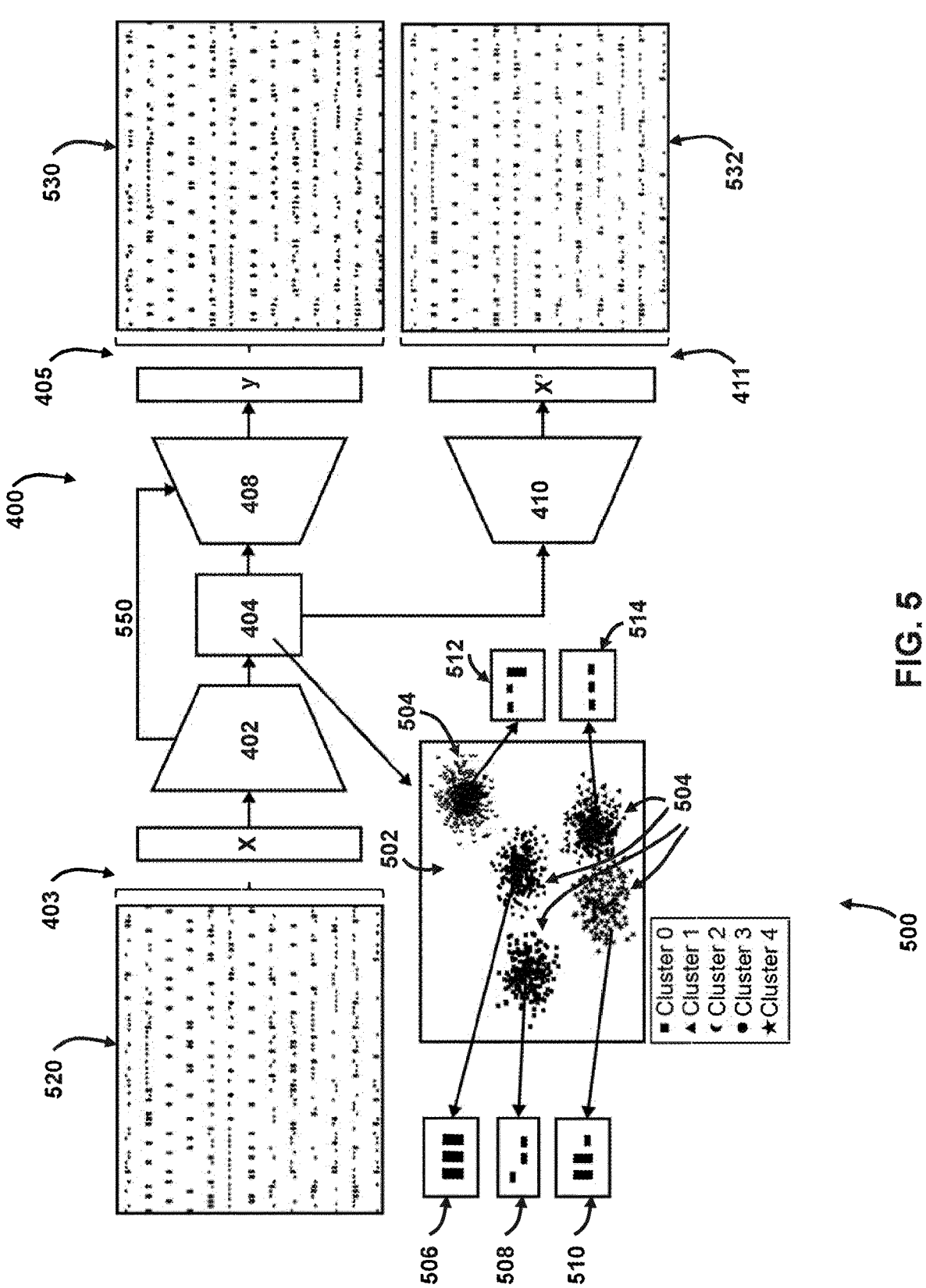
FIG. 5 illustrates clustering dimensional data in a latent space into clusters, with different clusters corresponding to different portions of a given input, according to an embodiment.

As described above, in operation 42, dimensional data in the latent space is clustered into clusters by the model, with different clusters corresponding to different portions of the given input. FIG. 5 illustrates clustering 500 dimensional data 502 in the latent space 404 into clusters 504, with different clusters 504 corresponding to different portions 506-514 (i.e., portion 506, portion 508, portion 510, portion 512 and portion 514) of the given input 403. In the example shown in FIG. 5, input 403 is an image 520 of a target mask design. Different portions 506-514 are associated with different patterns of the target mask design. As shown in FIG. 5, encoder or encoder network 402 maps high-dimensional data in the image 520 of the target design to low dimensional latent space 404.

Operation 42 (FIG. 3) comprises determining which clusters 504, or parts of clusters 504, of dimensional data 502 in latent space 404 (which are associated with different patterns of the target mask design) correspond to predicted outputs 405 with higher variance compared to other clusters 504, or other parts of clusters 504, of the dimensional data 502. Determining which clusters 504, or parts of clusters 504, of the dimensional data 502 in latent space 404 correspond to predicted outputs 405 with higher variance facilitates selection of additional training data. For example, training data that includes patterns (e.g., one or more of 506-514) associated with clusters (e.g., one or more clusters 504) that correspond to the outputs with higher variance may be selected for training.

Advantageously, latent space 404 is low dimensional (e.g., compared to the image space). This facilitates application of a clustering algorithm. Examples of clustering algorithms that can be applied include K-means clustering, mean-shift clustering, DBSCAN (Density-Based Spatial Clustering of Applications with Noise), expectation-maximization clustering, agglomerative hierarchical clustering, and/or other clustering algorithms. It should be noted that in some embodiments, clustering may be performed directly in an image space instead of in latent space 404. This may be computationally more expensive due at least to the high-dimensional value of the image space, but nonetheless possible.

After clustering, decoder 408 (or a portion of decoder network 406 shown in FIG. 4 that functions similar to a decoder) maps, projects, decodes, or otherwise transforms the low-dimensional encoding in latent space 404 to output 405. Output 405 is a predicted CTM image 530 in this example. Second decoder 410 maps, projects, decodes or otherwise transforms the low-dimensional encoding in latent space 404 back to a recovered version 411 of the given input 403 that corresponds to one or more of the clusters 504. In the example shown in FIG. 5, the recovered version of the given input is a recovered image 532 of the image 520 of the target mask design. Thus, encoder or encoder network 402 in combination with second decoder 410 implements an approximation of an identity operator. An identity operator is an operator that maps an input to an output without modifying it. Thus, ideally output equals input. In the case of an auto-encoder (402+410), due to the compression into a smaller latent space 404, we have an approximate identity operator, since some information is lost due to the compression. This is useful for visualizing patterns clustered and/or identified in latent space 404. In some embodiments, model 400 may be configured to provide a mapping (not shown in FIG. 5) from latent space 404 to properties such as a probability of defects, process window parameters, and/or other properties.

Responsive to clustering, pattern shapes 506-514 corresponding to individual clusters 504 may be visualized using second decoder 410. In addition, individual patterns 506-514 (which correspond to individual clusters 504) may be characterized using pattern using indicators such as pattern variability, pattern frequency, and/or other indicators. Decisions regarding the performance of model 400 may be made based on these indicators and/or other information. More examples of a particular pattern 506-514 and/or other similar patterns may be added to a training data set based on the particular pattern's high output prediction variability. Additional details are provided in the continued discussions of operations 44, 46, and 48 (FIG. 3) below.

In some embodiments, operation 42 (FIG. 3) includes determining locations in latent space 404 using clustering, gradient based methods, and/or other methods, that correspond to predicted outputs (e.g., patterns) with higher variance (which results in more model prediction uncertainty) compared to other locations in latent space 404. In other words, operation 42 may include searching latent space 404 to identify the locations (which correspond to patterns) in latent space 404 that model 400 captures worst. Inputs (e.g., images of patterns) that correspond to these locations in latent space 404 may be selected as additional training input.

When model 400 is trained (as described herein), latent space 404 forms a compressed, continuous representation of encoded patterns (for example), which facilitates performance of search and optimization operations in latent space 404. The search and optimization operations may include clustering, gradient based methods (e.g., gradient ascent), and/or other methods, for example.

Figure 6:
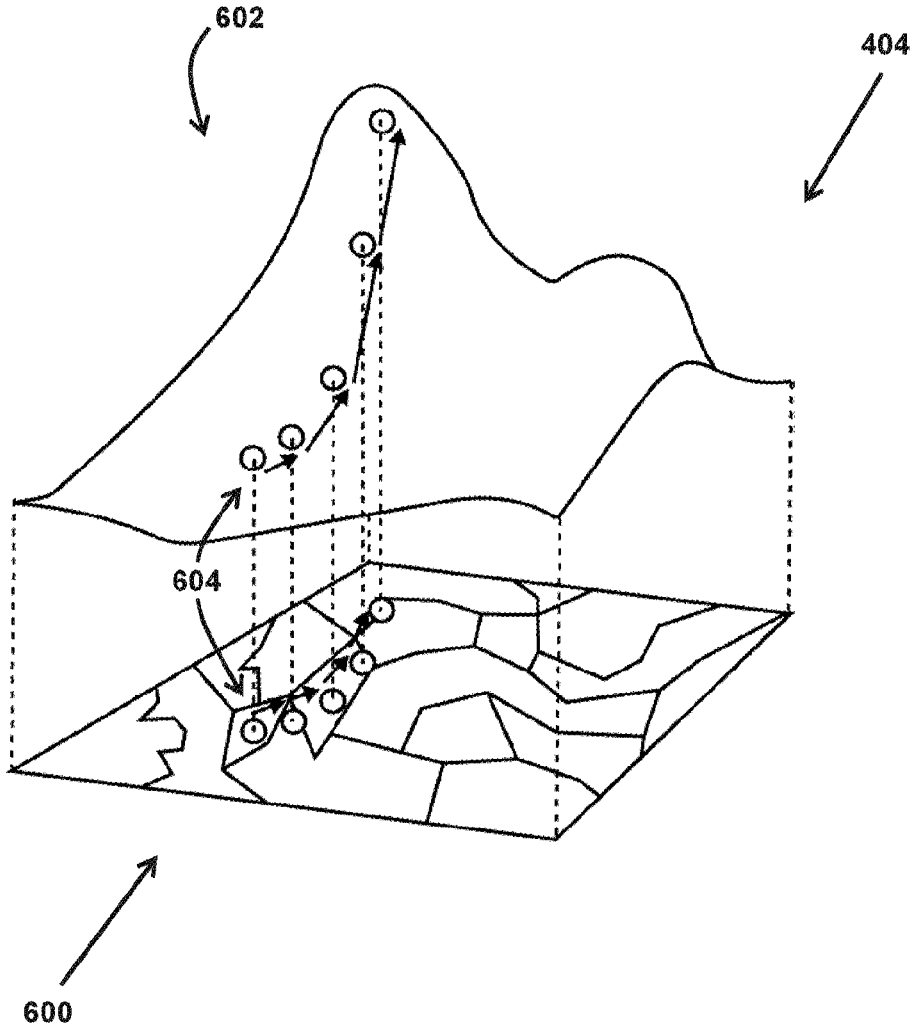
FIG. 6 illustrates a visualization of the latent space with a corresponding variance function and a possible path taken by an example gradient ascent algorithm that maximizes the variance, according to an embodiment.

FIG. 6 illustrates a visualization 600 of latent space 404 with a corresponding variance function 602 and a possible path 604 taken by an example gradient ascent algorithm that maximizes the variance (e.g., determines the location in latent space 404 that corresponds to an input pattern associated with the highest prediction uncertainty). Methods for determining the location in latent space 404 that corresponds to the highest variance (or prediction uncertainty) may vary. Different measures of variance may be used for maximization. For example, a maximum variance value may be relevant when a small area in an image is critical, whereas a root-mean-square variance value may work better for describing an overall fit. For metrology applications with images, an rms-like method weighted strongly towards feature edges may be used. Search methods can also be various, with the gradient search being just one example.

In some embodiments, the starting point for such a search can be a random location in latent space 404. In some embodiments, a starting location that corresponds to the output (e.g., pattern) with the highest variance, determined from a group of possible inputs (e.g., images of patterns), may be used instead. In some embodiments, operation 42 (FIG. 3) may include coarsely sampling latent space 404, for example regularly or randomly, and then selecting the location with highest output variance as a starting point. This approach can also be used during the optimization to avoid ending up at a local optimum. From the starting point, operation 42 may perform the gradient search (as one example) across latent space 404 to determine a location that corresponds to maximum output variance.

It should be noted that outputs (e.g., patterns) should be relevant for a particular use case (e.g., there is no need to extrapolate to describe irrelevant esoteric patterns). This means that there is likely no need to search along or beyond the boundaries of latent space 404 (when model 400 is reasonably trained). If the gradient search (for example) determines that the location that corresponds to the maximum output variance is located toward a latent space boundary, model 400 output 405 may need to be checked for relevance, latent space 404 may need to be extended in a corresponding direction (e.g., by adding dimensionality, additional training data, etc.), and/or a new starting location may need to be determined. Starting locations close to an origin of latent space 404 may need to be avoided as this may be, or be similar to a singularity, and may not eventually produce a relevant decoded image.

Referring again to FIG. 3 and FIG. 5, in operation 44 (FIG. 3), output 405 (FIG. 5) comprises a predicted mask image (e.g., 530 shown in FIG. 5), a probability of defects, predicted process parameters for the semiconductor manufacturing process, and/or other predictions. Output 405 is predicted based on the dimensional data in latent space 404 and/or other information. Output 405 is predicted with a first portion of the encoder-decoder architecture. In some embodiments, the first portion of the encoder-decoder architecture is a first decoder 408. However, decoder 408 of the encoder-decoder architecture may not be a traditional decoder. For example, decoder 408 of the encoder-decoder architecture may include skip connections 550 coming from encoder or encoder network 402 that do not pass through latent space 404. Pure encoder-decoder architecture does not typically include skip connections, for example. Skip connections are used in order to transfer high-resolution information from input to output. This improves the quality of the output. Latent space 404 does not necessarily contain complete information in order to produce output 405, as such information is not needed. (However, recovered version 411 (described below) does need to be generated purely from latent space 404. Therefore, no skip connections are present between 402 and 410.)

In operation 46 (FIG. 3), the dimensional data in latent space 404 (FIG. 5) is transformed (e.g., decoded, projected, mapped, etc.) into the recovered version 411 of the given input 403 by a second portion of the encoder-decoder architecture. The second portion of the encoder-decoder architecture may be second decoder 410, for example. It should be noted that second decoder 410 does not include the skip connections 550 included in the first portion (e.g., first decoder 408) of the encoder-decoder architecture. The dimensional data in latent space 404 is transformed into the recovered version 411 of the given input 403 to facilitate visualization of points of interest in latent space 404. The points of interest comprise points with high variance or uncertainty (as described related to FIG. 6, for example). In some embodiments, the points of interest comprise one or more of the points with relatively high variance or uncertainty compared to other points in the latent space, points that are not located within a cluster, points located at a cartesian distance that is relatively far from one or more other points and/or clusters in the latent space compared to cartesian distances between other points and/or clusters in the latent space, and/or other points of interest. For example, a point that does not appear to be part of any cluster may be a point of interest. A point that is a threshold cartesian distance from another point and/or another cluster may be a point of interest. These examples are not intended to be limiting.

In operation 48 (FIG. 3), the points of interest, the clusters, the output, the recovered version of the given input, and/or other information may be used to evaluate performance of parameterized model 400 (FIG. 5). For example, the points of interest and/or the output may be used to determine prediction consistency (or variance) for a given input. In some embodiments, operation 48 comprises making the parameterized model more descriptive by adding to the dimensionality of the latent space, and/or training the parameterized model with more diverse training data associated with one or more of the determined clusters or parts of clusters, or a location in latent space 404 (FIG. 5 and FIG. 6) associated with the higher variance (e.g., patterns associated with higher prediction uncertainty). In some embodiments, adding to a dimensionality of the latent space comprises configuring the latent space to describe or represent more dimensions or features of an input (see the example of dimensions or features of an image described above). By way of a non-limiting example, adding to a dimensionality of the latent space may comprise encoding feature vectors in the latent space with more features relative to originally or previously encoded feature vectors for given inputs (e.g., images) and/or other operations. In some embodiments, adding to the dimensionality of the latent space comprises any change in the encoder-decoder network architecture that leads to an increase of dimensions in the latent space (e.g., a layer between the encoder and decoder).

In some embodiments, determining separate per-pattern information (e.g., statistics such as variance, latent space coverage, per-cluster distribution, etc.), determining a location in latent space 404 associated with the highest prediction uncertainty, and/or other operations as described above, facilitates determination of pattern types that are well known to parameterized model 400 (e.g., and are associated with consistent predictions) and pattern types that are relatively unfamiliar (e.g., and are associated with widely variable predictions). Operation 48 may include improving the training of parameterized model 400 by training model 400 with training data comprising patterns associated with higher uncertainty in model 400 predictions. Retraining or further training model 400 with this enhanced set of inputs (e.g., patterns) improves the model's prediction performance.

In some embodiments, operation 48 comprises retraining, further training, and/or otherwise adjusting the parameterized model based on the clusters, the points of interest (e.g., the points with the highest variance), the output, and/or the recovered version of the input to enhance agreement between one or more portions of the output (e.g., dimensions of a particular pattern, a specific type of defect, manufacturing process parameter windows, etc.) and one or more portions of a ground truth. A ground truth may be a known or measured property of a physical version of the thing modeled by the parameterized model (e.g., pattern dimensions of a physical mask, a location of a specific type of defect, process parameters used in an actual manufacturing process, etc.).

In some embodiments, making the parameterized model more descriptive by adding to the dimensionality of the latent space, or training the parameterized model with more diverse training data associated with one or more of the clusters or points associated with the highest prediction uncertainty, comprises: using more diverse images, more diverse data, and additional clips related to one or more of the clusters, relative to prior training material, as input to train the parameterized model; and/or using more dimensions for encoding vectors, and more encoding layers in the parameterized model. Any or all of these things may be determined based on the clusters and corresponding patterns and/or points in latent space 404 associated with higher prediction uncertainty and/or other information. As described above, using this information as training data allows the parameterized model to make more accurate predictions for these and other similar patterns.

In some embodiments, data associated with one or more clusters or points associated with the highest prediction uncertainty may comprise data corresponding to one or more of the points in the latent space with relatively high variance or uncertainty compared to other points in the latent space, data corresponding to points located within a specific cluster, data corresponding to points that are not located within a cluster, data corresponding to points located at a cartesian distance that is relatively far from one or more other points in the latent space compared to cartesian distances between other points in the latent space, and/or other data. In other words, the diversity of the training data used to adjust the model need not be limited to data associated with a given cluster, or point, in the latent space, for example. Data unrelated to a specific cluster or point in the latent space may be used to adjust (e.g., retrain) the model, and/or be used for other purposes. For example, completely new or different training data may be used. More diverse images and/or more diverse data may refer to images and/or data describing new and/or different features than ones used for prior training, images and/or data describing a different portion of a target design or pattern that those used in prior training, images and/or data for different processing conditions than those used in prior training, and/or other information.

In some embodiments, operation 48 comprises training, retraining, further training, and/or otherwise adjusting the parameterized model based on samples taken from the dimensional data in the latent space. This training (retraining, etc.) comprises sampling the dimensional data in the latent space and for each sample from the latent space: predicting multiple output realizations to generate a distribution of output realizations for given dimensional data in the latent space; and determining an uncertainty (or variance) associated with the distribution of the multiple output realizations. A separate parameterized model for uncertainty prediction can then be trained (retrained, etc.) with the given dimensional data and the corresponding determined uncertainty. Output from this separate parameterized model can be used to guide (e.g., find the areas of the latent space associated with the highest uncertainty) the training of the (first) parameterized model, for example.

In some embodiments, the sampling comprises determining which portions of the dimensional data in the latent space correspond to predicted output realizations with higher variance compared to other portions of the dimensional data, and sampling from the portions that correspond to higher variance. In some embodiments, the sampling may be performed based on output from the gradient ascent algorithm applied to the separate parameterized mode for uncertainty prediction described above related to FIG. 6 and/or other information. As described above and shown in FIG. 6, the gradient ascent algorithm maximizes variance in the latent space (e.g., determines the location in latent space 404 (FIG. 4) that corresponds to an input pattern associated with the highest prediction uncertainty). Samples of the data in the latent space (e.g., 404) may be taken at or near the location or locations output by the gradient ascent algorithm. Samples may be taken at or near the location output by the gradient ascent algorithm because this latent space dimensional data represents one or more patterns for which the parameterized model is the least trained to handle (e.g., generates the highest prediction uncertainty).

It should be noted that methods for determining the location in latent space 404 (FIG. 4) that corresponds to the highest variance (or prediction uncertainty) may vary. As described above, different measures of variance (or prediction uncertainty) may be used for maximization. For example, a maximum variance value may be relevant when a small area in an image is critical, whereas a root-mean-square variance value may work better for describing an overall fit. For metrology applications with images, an rms-like method weighted strongly towards feature edges may be used. Search methods can also be various, with the gradient ascent search algorithm being just one example.

In some embodiments, the given dimensional data and corresponding uncertainties form input output training pairs. In some embodiments, the separate parameterized model comprises a machine learning model comprising a variational auto-encoder (e.g., with encoding and decoding architecture) that includes at least one neural network (e.g., having nodes, etc., as described herein). Training the separate parameterized model with the given dimensional data and the corresponding uncertainties comprises providing the input output training pairs to a neural network so the variational auto-encoder can learn to predict new output realizations.

As described herein, the encoder architecture comprises a portion of the parameterized model configured to transform model inputs into the dimensional data in the latent space, and the decoder architecture comprises a different portion of the parameterized model configured to transform the dimensional data in the latent space into the output realizations.

By way of a non-limiting practical example, in some embodiments, model inputs may be associated with a target pattern design, defects, or process parameters for a semiconductor manufacturing process. The dimensional data in the latent space may comprise multi-dimensional vectors associated with model inputs. The multiple output realizations may comprise predicted mask images, defect probabilities, predicted process parameters for a semiconductor manufacturing process, and/or other information. In some embodiments, the predicting comprises decoding, with one or more layers and/or one or more nodes of a neural network, a multi-dimensional vector of the dimensional data into an output realization.

Determining the uncertainty may comprise determining a variance of the predicted multiple output realizations and/or other information. In some embodiments, determining the variance comprises determining a range, a standard deviation, a maximum, a minimum, an average, a median, a mode, and/or other characteristics of the predicted multiple output realizations. For example, the predicted multiple output realizations may comprise images, and determining the uncertainty may comprise determining a metric indicative of differences between the images. Metrics indicative of such differences may include a visual indicator, a range of a given image property, a standard deviation of a given image property, a maximum and/or minimum image property, a median image, a mode image, and/or other metrics.

Put another way, training a separate parameterized model for an uncertainty prediction may comprise sampling the dimensional data in the latent space z (e.g., generating input data), where z represents the dimensional data in the latent space which may be (low) dimensional encodings (vectors) in the latent space, for example. Sampling of the dimensional data in the latent space z may be from a prior distribution p(z) (e.g., of the low dimensional encodings) used during earlier training of the parameterized model (e.g., the variational auto-encoder), for example. For each sample of z, the same sample is passed through the decoder portion of the variational auto-encoder several times to generate multiple output realizations (predictions) for that sample (e.g., output data). These output realizations may be aggregated and their variance v(z) may be determined. The sample of z and the corresponding variance v(z) may form input output training pairs (z, v(z)), for example. Training the parameterized model for the uncertainty prediction may comprise providing the input output training pairs to the (at least one) neural network so the variational auto-encoder can learn to (better) predict new output realizations (e.g. for the same or different model inputs). These operations may be repeated several times for several different samples of z.

In some embodiments, operation 48 comprises adjusting the parameterized model based on the clusters, the points of interest, the output, and/or the recovered version of the given input to increase the certainty of the parameterized model. The adjusting may be configured to decrease a variance of the parameterized model predictions, enhance the parameterized model predictions for new patterns, and/or configured for other purposes. In some embodiments, operation 48 comprises adjusting, based on the clusters, the points of interest, the output, and/or the recovered version of the given input, one or more parameters of the parameterized model (e.g., weights, a number of layers, dimensionality of the latent space, etc.) to increase certainty of the parameterized model predictions. In some embodiments, adjusting the parameterized model may comprise training or retraining the model as described herein (e.g., based on patterns associated with higher prediction uncertainty). In some embodiments, adjusting the parameterized model may comprise manually changing weights, the number of layers, the dimensionality of the latent space, etc.

In some embodiments, adjusting comprises making the parameterized model more descriptive by adding to the dimensionality of the latent space, and/or training the parameterized model with more diverse training data associated with one or more of the determined clusters or parts of clusters associated with the higher variance (where individual clusters in the latent space correspond to different encoded patterns in the dimensional data as described herein). Adjusting may include determining which clusters, or parts of clusters, of the dimensional data in the latent space correspond to predicted outputs with higher variance compared to other clusters, or other parts of clusters, of the dimensional data (e.g., as described herein). Determining which clusters, or parts of clusters, of the dimensional data in the latent space correspond to predicted outputs with higher variance facilitates selection of additional training data. Making the parameterized model more descriptive comprises using more diverse images and more diverse data related to one or more of the clusters, relative to prior training material, as input to train the parameterized model; using more dimensions for encoding vectors, and more encoding layers in the parameterized model; and/or other operations.

In some embodiments, adjusting the one or more parameters of the parameterized model comprises determining separate per-pattern (e.g., or per cluster) information that indicates which pattern types are well known to the parameterized model and result in comparatively consistent predictions, and which pattern types are unfamiliar to the parameterized mode and result in comparatively variable predictions (e.g., using one or more of the operations described herein). The separate per-pattern information comprises variance, latent space coverage, a distribution, and/or other information.

By way of a non-limiting example, the adjusting may be done for predicting substrate, mask, reticle, and/or other geometry as part of a semiconductor manufacturing process. As another example, operation 48 may comprise adjusting the parameterized model based on the clusters, the output, the points of interest, and/or the recovered version of the given input to increase the certainty of the parameterized model for predicting a continuous transmission mask (CTM) as part of a semiconductor manufacturing process. The examples are not intended to be limiting. The adjusting may be done for any parameterized model where increasing certainty in parameterized model predictions is advantageous.

In some embodiments, operation 48 comprises determining adjustments to one or more semiconductor manufacturing process parameters based on predictions from the adjusted parameterized model. In some embodiments, the one or more determined semiconductor manufacturing process parameters comprise one or more of a mask design, a pupil shape, a dose, a focus, and/or other parameters. In some embodiments, the one or more determined semiconductor manufacturing process parameters comprise the mask design such that the mask design is changed from a first mask design to a second mask design. Other examples, related to several different aspects of an integrated circuit fabrication process, and/or other processes, are contemplated.

Figure 7:
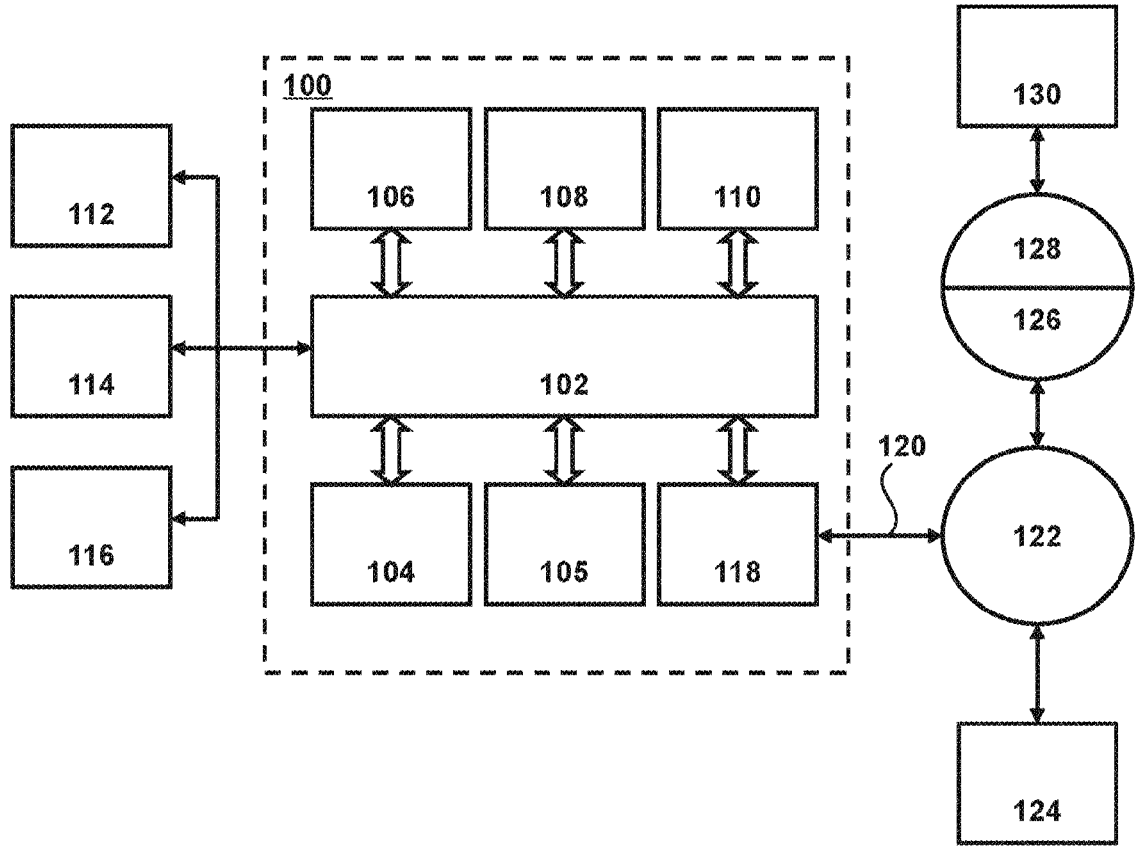
FIG. 7 is a block diagram of an example computer system, according to an embodiment.

FIG. 7 is a block diagram that illustrates a computer system 100 that can assist in implementing the methods, flows, or the apparatus disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of one or more methods described herein may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 may also include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application may provide all or part of a method described herein, for example. The received code may be executed by processor 104 as it is received, and/or stored in storage device 110, or other non-volatile storage for later execution. In this manner, computer system 100 may obtain application code in the form of a carrier wave.

Figure 8:
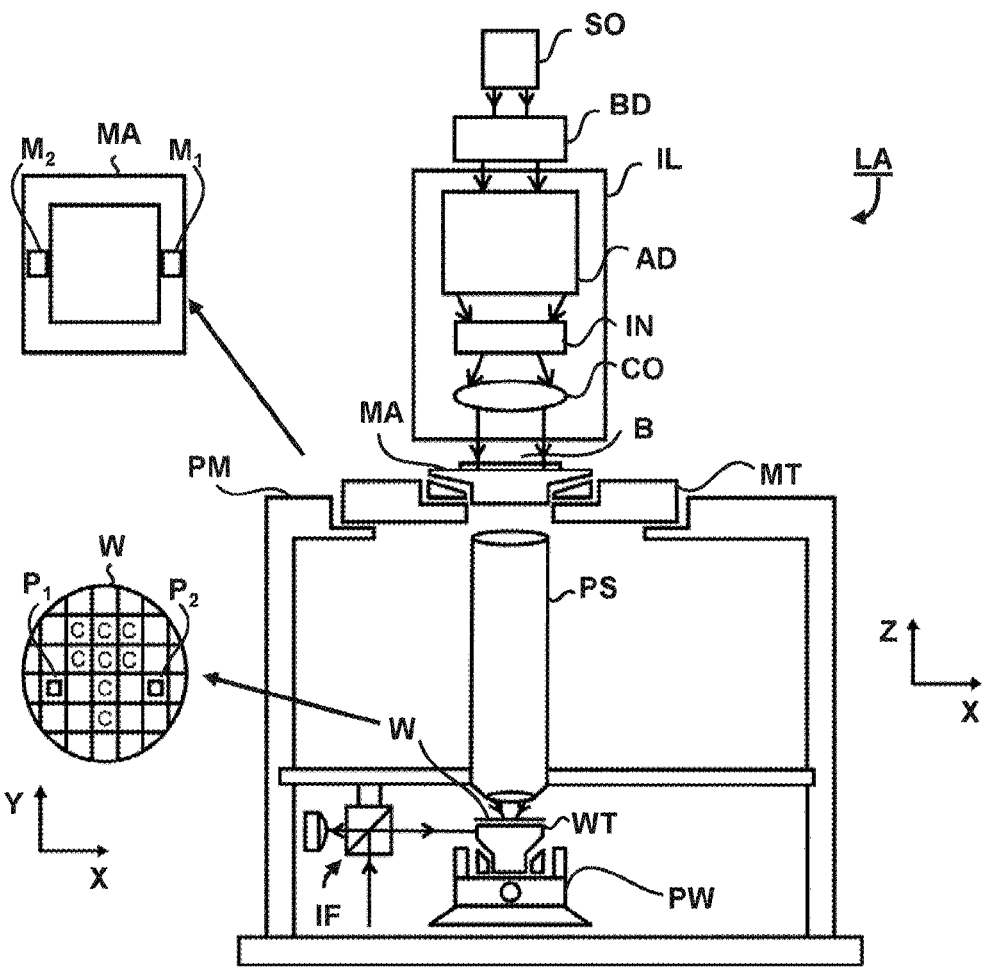
FIG. 8 is a schematic diagram of a lithographic projection apparatus, according to an embodiment.

FIG. 8 is a schematic diagram of a lithographic projection apparatus, according to an embodiment. The lithographic projection apparatus can include an illumination system IL, a first object table MT, a second object table WT, and a projection system PS. Illumination system IL can condition a beam B of radiation. In this example, the illumination system also comprises a radiation source SO. First object table (e.g., a patterning device table) MT can be provided with a patterning device holder to hold a patterning device MA (e.g., a reticle), and connected to a first positioner to accurately position the patterning device with respect to item PS. Second object table (e.g., a substrate table) WT can be provided with a substrate holder to hold a substrate W (e.g., a resist coated silicon wafer), and connected to a second positioner to accurately position the substrate with respect to item PS. Projection system (e.g., which includes a lens) PS (e.g., a refractive, catoptric or catadioptric optical system) can image an irradiated portion of the patterning device MA onto a target portion C (e.g., comprising one or more dies) of the substrate W.

As depicted, the apparatus can be of a transmissive type (i.e., has a transmissive patterning device). However, in general, it may also be of a reflective type, for example (with a reflective patterning device). The apparatus may employ a different kind of patterning device for a classic mask; examples include a programmable mirror array or LCD matrix.

The source SO (e.g., a mercury lamp or excimer laser, LPP (laser produced plasma) EUV source) produces a beam of radiation. This beam is fed into an illumination system (illuminator) IL, either directly or after having traversed conditioning means, such as a beam expander, for example. The illuminator IL may comprise adjusting means AD for setting the outer and/or inner radial extent (commonly referred to as sigma-outer and sigma-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross section.

In some embodiments, source SO may be within the housing of the lithographic projection apparatus (as is often the case when source SO is a mercury lamp, for example), but that it may also be remote from the lithographic projection apparatus. The radiation beam that it produces may be led into the apparatus (e.g., with the aid of suitable directing mirrors), for example. This latter scenario can be the case when source SO is an excimer laser (e.g., based on KrF, ArF or F2 lasing), for example.

The beam B can subsequently intercept patterning device MA, which is held on a patterning device table MT. Having traversed patterning device MA, the beam B can pass through the lens, which focuses beam B onto target portion C of substrate W. With the aid of the second positioning means (and interferometric measuring means IF), the substrate table WT can be moved accurately, e.g. to position different target portions C in the path of beam B. Similarly, the first positioning means can be used to accurately position patterning device MA with respect to the path of beam B, e.g., after mechanical retrieval of the patterning device MA from a patterning device library, or during a scan. In general, movement of the object tables MT, WT can be realized with the aid of a long-stroke module (coarse positioning) and a short-stroke module (fine positioning). However, in the case of a stepper (as opposed to a step-and-scan tool), patterning device table MT may be connected to a short stroke actuator, or may be fixed.

The depicted tool can be used in two different modes, step mode and scan mode. In step mode, patterning device table MT is kept essentially stationary, and an entire patterning device image is projected in one operation (i.e., a single "flash") onto a target portion C. Substrate table WT can be shifted in the x and/or y directions so that a different target portion C can be irradiated by beam B. In scan mode, essentially the same scenario applies, except that a given target portion C is not exposed in a single "flash." Instead, patterning device table MT is movable in a given direction (e.g., the "scan direction", or the "y" direction) with a speed v, so that projection beam B is caused to scan over a patterning device image. Concurrently, substrate table WT is simultaneously moved in the same or opposite direction at a speed V=Mv, in which M is the magnification of the lens (typically, M=1/4 or 1/5). In this manner, a relatively large target portion C can be exposed, without having to compromise on resolution.

Figure 9:
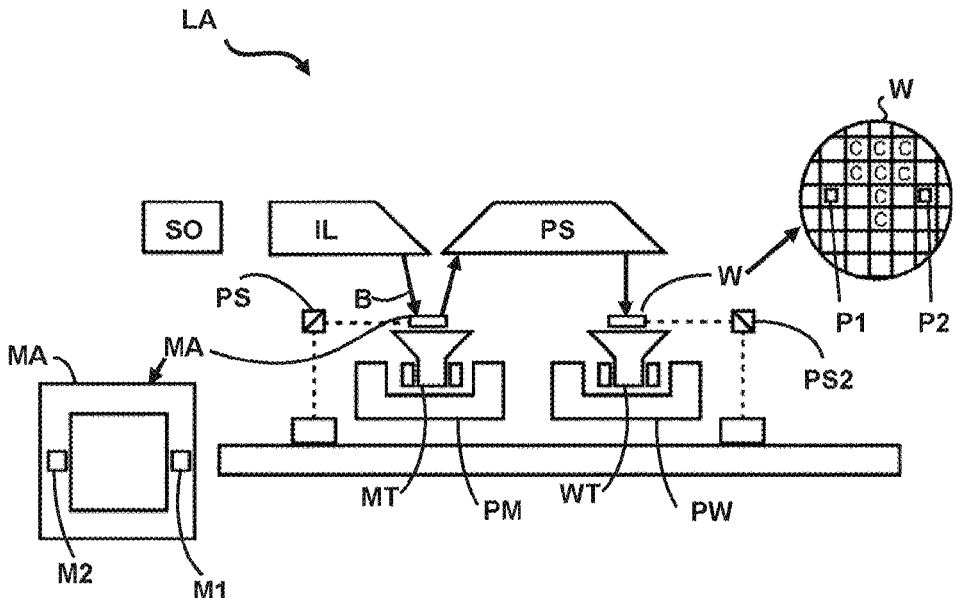
FIG. 9 is a schematic diagram of another lithographic projection apparatus, according to an embodiment.

FIG. 9 is a schematic diagram of another lithographic projection apparatus LA. LA can include source collector module SO, illumination system (illuminator) IL configured to condition a radiation beam B (e.g. EUV radiation), support structure MT, substrate table WT, and projection system PS. Support structure (e.g. a patterning device table) MT can be constructed to support a patterning device (e.g. a mask or a reticle) MA and connected to a first positioner PM configured to accurately position the patterning device. Substrate table (e.g. a wafer table) WT can be constructed to hold a substrate (e.g. a resist coated wafer) W and connected to a second positioner PW configured to accurately position the substrate. Projection system (e.g. a reflective projection system) PS can be configured to project a pattern imparted to the radiation beam B by patterning device MA onto a target portion C (e.g. comprising one or more dies) of the substrate W.

As shown in this example, LA can be of a reflective type (e.g. employing a reflective patterning device). It is to be noted that because most materials are absorptive within the EUV wavelength range, the patterning device may have multilayer reflectors comprising, for example, a multi-stack of molybdenum and silicon. In one example, the multi-stack reflector has a 40 layer pairs of molybdenum and silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

Illuminator IL can receive an extreme ultra violet radiation beam from source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP"), the plasma can be produced by irradiating a fuel, such as a droplet, stream or cluster of material having the line-emitting element, with a laser beam. Source collector module SO may be part of an EUV radiation system including a laser (not shown in FIG. 10), for providing the laser beam exciting the fuel. The resulting plasma emits output radiation, e.g., EUV radiation, which is collected using a radiation collector, disposed in the source collector module. The laser and the source collector module may be separate entities, for example when a $CO_2$ laser is used to provide the laser beam for fuel excitation. In this example, the laser may not be considered to form part of the lithographic apparatus and the radiation beam can be passed from the laser to the source collector module with the aid of a beam delivery system comprising, for example, suitable directing mirrors and/or a beam expander. In other examples, the source may be an integral part of the source collector module, for example when the source is a discharge produced plasma EUV generator, often termed a DPP source.

Illuminator IL may comprise an adjuster for adjusting the angular intensity distribution of the radiation beam. Generally, at least the outer and/or inner radial extent (commonly referred to as sigma-outer and sigma-inner, respectively) of the intensity distribution in a pupil plane of the illuminator can be adjusted. In addition, the illuminator IL may comprise various other components, such as facetted field and pupil mirror devices. The illuminator may be used to condition the radiation beam, to have a desired uniformity and intensity distribution in its cross section.

The radiation beam B can be incident on the patterning device (e.g., mask) MA, which is held on the support structure (e.g., patterning device table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor PS2 (e.g. an interferometric device, linear encoder, or capacitive sensor), the substrate table WT can be moved accurately (e.g. to position different target portions C in the path of radiation beam B). Similarly, the first positioner PM and another position sensor PS can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus LA may be used in at least one of the following modes, step mode, scan mode, and stationary mode. In step mode, the support structure (e.g. patterning device table) MT and the substrate table WT are kept essentially stationary, while an entire pattern imparted to the radiation beam is projected onto a target portion C at one time (e.g., a single static exposure). The substrate table WT is then shifted in the X and/or Y direction so that a different target portion C can be exposed. In scan mode, the support structure (e.g. patterning device table) MT and the substrate table WT are scanned synchronously while a pattern imparted to the radiation beam is projected onto target portion C (i.e. a single dynamic exposure). The velocity and direction of substrate table WT relative to the support structure (e.g. patterning device table) MT may be determined by the (de)magnification and image reversal characteristics of the projection system PS. In stationary mode, the support structure (e.g. patterning device table) MT is kept essentially stationary holding a programmable patterning device, and substrate table WT is moved or scanned while a pattern imparted to the radiation beam is projected onto a target portion C. In this mode, generally a pulsed radiation source is employed, and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Figure 10:
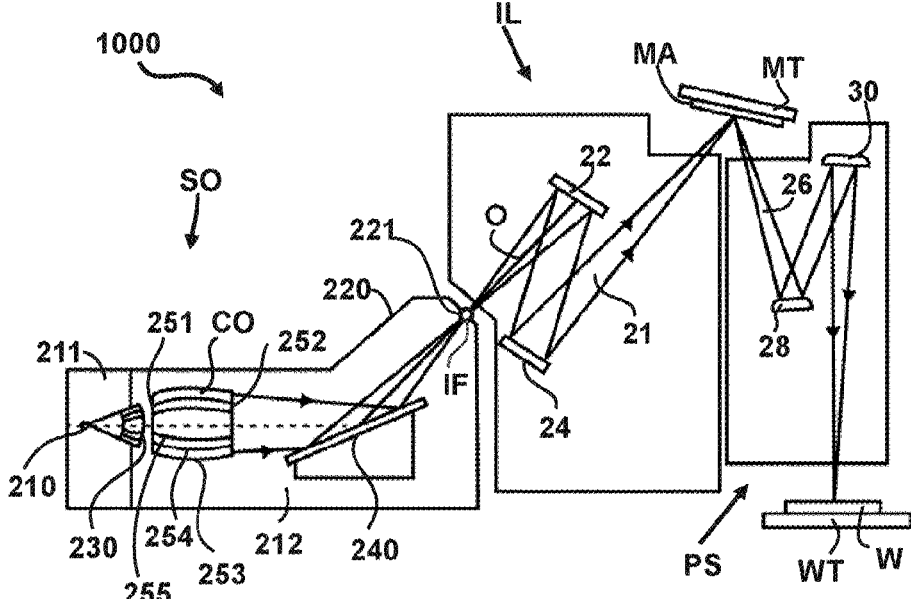
FIG. 10 is a more detailed view of the apparatus in FIG. 9, according to an embodiment.

FIG. 10 is a detailed view of a lithographic projection apparatus 1000 similar to or the same as LA shown in FIGS. 9 (and 8). As shown in FIG. 10, the lithographic projection apparatus can include the source collector module SO, the illumination system IL, and the projection system PS. The source collector module SO is configured such that a vacuum environment can be maintained in an enclosing structure 220 of the source collector module SO. An EUV radiation emitting plasma 210 may be formed by a discharge produced plasma source. EUV radiation may be produced by a gas or vapor, for example Xe gas, Li vapor or Sn vapor in which the hot plasma 210 is created to emit radiation in the EUV range of the electromagnetic spectrum. The hot plasma 210 is created by, for example, an electrical discharge causing at least partially ionized plasma. Partial pressures of, for example, 10 Pa of Xe, Li, Sn vapor or any other suitable gas or vapor may be required for efficient generation of the radiation. In some embodiments, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. The collector chamber 211 may include a radiation collector CO which may be a grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line 'O'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently, the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of radiation beam 21 at the patterning device MA, held by the support structure MT, a patterned beam 26 is formed and the patterned beam 26 is imaged by the projection system PS via reflective elements 28, 30 onto a substrate W held by the substrate table WT. More elements than shown may generally be present in illumination optics unit IL and projection system PS. The grating spectral filter 240 may optionally be present, depending upon the type of lithographic apparatus, for example. Further, there may be more mirrors present than those shown in the figures, for example there may be 1-6 additional reflective elements present in the projection system PS than shown in FIG. 10.

Collector optic CO, as illustrated in FIG. 10, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type may be used in combination with a discharge produced plasma source, often called a DPP source.

Figure 11:
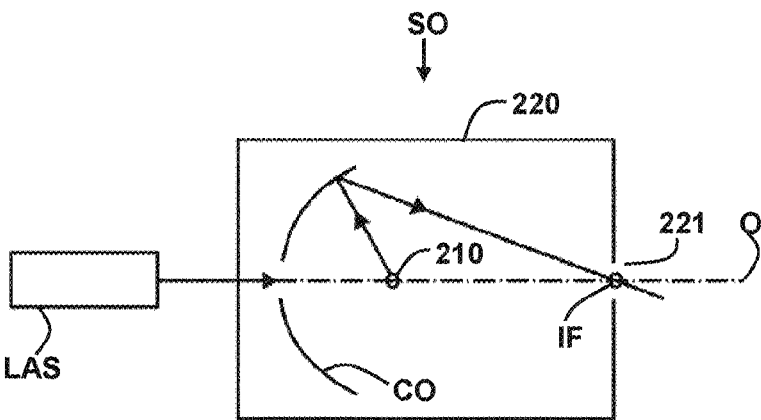
FIG. 11 is a more detailed view of the source collector module SO of the apparatus of FIG. 9 and FIG. 10, according to an embodiment.

FIG. 11 is a detailed view of source collector module SO of the lithographic projection apparatus shown in previous figures. Source collector module SO may be part of an lithographic projection apparatus radiation system. A laser LAS can be arranged to deposit laser energy into a fuel, such as xenon (Xe), tin (Sn) or lithium (Li), creating the highly ionized plasma 210 with electron temperatures of several 10's of eV. The energetic radiation generated during de-excitation and recombination of these ions is emitted from the plasma, collected by a near normal incidence collector optic CO and focused onto the opening 221 in the enclosing structure 220.

The concepts disclosed herein may simulate or mathematically model any generic imaging system for imaging sub wavelength features, and may be especially useful with emerging imaging technologies capable of producing increasingly shorter wavelengths. Emerging technologies already in use include EUV (extreme ultra violet), DUV lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

The embodiments may further be described using the following clauses:

1. A method for determining adjustments to semiconductor manufacturing process parameters, the method comprising:

clustering, with a parameterized model, dimensional data in a latent space associated with the parameterized model into clusters, wherein different clusters correspond to different portions of a given input;

predicting, with the parameterized model, an output based on the dimensional data in the latent space;

transforming, with the parameterized model, the dimensional data in the latent space into a recovered version of the given input that corresponds to one or more of the clusters;

adjusting, based on the clusters, the output, and/or the recovered version of the given input, one or more parameters of the parameterized model to increase certainty of the parameterized model predictions; and determining adjustments to one or more semiconductor manufacturing process parameters based on predictions from the adjusted parameterized model.

2. The method of clause 1, further comprising adjusting the parameterized model based on the clusters, the output, and/or the recovered version of the given input to increase the certainty of the parameterized model for predicting a continuous tone mask (CTM) as part of the semiconductor manufacturing process.

3. The method of any of clauses 1 to 2, wherein the one or more determined semiconductor manufacturing process parameters comprise one or more of a mask design, a pupil shape, a dose, or a focus.

4. The method of clause 3, wherein the one or more determined semiconductor manufacturing process parameters comprise the mask design, and determining adjustments to the one or more semiconductor manufacturing process parameters comprises changing the mask design from a first mask design to a second mask design.

5. The method of any of clauses 1 to 4, wherein the given input comprises one or more of an image, a clip, an encoded image, an encoded clip, or data from a prior layer of the parameterized model.

6. A method for making parameterized model predictions, the method comprising:

clustering, with a parameterized model, dimensional data in a latent space associated with the parameterized model into clusters, wherein different clusters correspond to different portions of a given input;

predicting, with the parameterized model, an output based on the dimensional data in the latent space; and transforming, with the parameterized model, the dimensional data in the latent space into a recovered version of the given input that corresponds to one or more of the clusters.

7. The method of clause 6, wherein the predicting and the transforming are simultaneous.

8. The method of clauses 6 or 7, wherein the dimensional data in the latent space is transformed into the recovered version of the given input to facilitate visualization of points of interest in the latent space.

9. The method of any of clauses 6 to 8, further comprising identifying points of interest in the latent space.

10. The method of clause 9, wherein the points of interest comprise one or more of points with relatively high variance or uncertainty compared to other points in the latent space, points that are not located within a cluster, or points located at a cartesian distance that is relatively far from one or more other points and/or clusters in the latent space compared to cartesian distances between other points and/or other clusters in the latent space.

11. The method of any of clauses 8 to 10, further comprising using the points of interest, the clusters, the recovered version of the given input, and/or the output to evaluate performance of the parameterized model.

12. The method of any of clauses 6 to 11, further comprising transforming, with the parameterized model, higher dimensional data associated with the given input into the dimensional data in the latent space.

13. The method of any of clauses 6 to 12, wherein the parameterized model is a machine learning model.

14. The method of any of clauses 6 to 13, wherein the parameterized model comprises encoder-decoder architecture.

15. The method of clause 14, wherein the encoder-decoder architecture comprises variational encoder-decoder architecture, the method further comprising training the variational encoder-decoder architecture with a probabilistic latent space, which generates realizations in an output space.

16. The method of clause 15, wherein the latent space comprises low dimensional encodings.

17. The method of any of clauses 14 to 16, wherein the dimensional data in the latent space is encoded by an encoder of the encoder-decoder architecture.

18. The method of any of clauses 14 to 17, wherein the output is predicted based on the dimensional data in the latent space with a first portion of the encoder-decoder architecture.

19. The method of clause 18, wherein the first portion of the encoder-decoder architecture is a first decoder.

20. The method of any of clauses 14 to 19, wherein the dimensional data in the latent space is transformed into the recovered version of the given input by a second decoder of the encoder-decoder architecture.

21. The method of any of clauses 6 to 20, wherein the given input comprises one or more of an image, a clip, an encoded image, an encoded clip, or data from a prior layer of the parameterized model, associated with a semiconductor manufacturing process.

22. The method of clause 21, wherein the given input is associated with a target pattern design, defects, or process parameters for the semiconductor manufacturing process.

23. The method of any of clauses 6 to 22, wherein the output comprises a predicted mask image, a probability of defects, or predicted process parameters for the semiconductor manufacturing process.

24. The method of any of clauses 6 to 23, further comprising adjusting the parameterized model based on the clusters, the output, and/or the recovered version of the input.

25. The method of clause 24, wherein the adjusting is configured to enhance agreement between one or more portions of the output and one or more portions of a ground truth.

26. The method of any of clauses 24 or 25, wherein adjusting the parameterized model comprises making the parameterized model more descriptive by adding to a dimensionality of the latent space, and/or training the parameterized model with more diverse training data associated with one or more of the clusters.

27. The method of clause 26, wherein making the parameterized model more descriptive by adding to the dimensionality of the latent space, or training the parameterized model with more diverse training data associated with one or more of the clusters, comprises:

using more diverse images, more diverse data, and additional clips related to one or more of the clusters, relative to prior training material, as input to train the parameterized model; and/or using more dimensions for encoding vectors, and more encoding layers in the parameterized model.

28. The method of any of clauses 26 or 27, wherein the more diverse training samples comprise additional and/or more diverse images, additional and/or more diverse data, and additional and/or more diverse clips relative to prior training material.

29. The method of any of clauses 6 to 28, further comprising determining which clusters, or parts of clusters, of the dimensional data in the latent space correspond to predicted outputs with higher variance compared to other clusters, or other parts of clusters, of the dimensional data.

30. The method of clause 29, wherein determining which clusters, or parts of clusters, of the dimensional data in the latent space correspond to predicted outputs with higher variance facilitates selection of additional training data.

31. The method of clause 30, further comprising making the parameterized model more descriptive by adding to the dimensionality of the latent space, and/or training the parameterized model with more diverse training data associated with one or more of the determined clusters or parts of clusters associated with the higher variance.

32. The method of any of clauses 6 to 31, further comprising adjusting the parameterized model based on the clusters, the output, and/or the recovered version of the given input to increase the certainty of the parameterized model for predicting substrate geometry as part of a semiconductor manufacturing process.

33. The method of any of clauses 6 to 32, further comprising adjusting the parameterized model based on the clusters, the output, and/or the recovered version of the given input to increase the certainty of the parameterized model for predicting a continuous tone mask (CTM) as part of a semiconductor manufacturing process.

34. The method of any of clauses 6 to 33, further comprising training the parameterized model, the training comprising:

sampling the dimensional data in the latent space and for each sample in the latent space:

predicting multiple output realizations to generate a distribution of output realizations for given dimensional data in the latent space; and determining an uncertainty associated with the distribution of the multiple output realizations; and training the parameterized model based on the given dimensional data and the determined uncertainty.

35. The method of clause 34, wherein the parameterized model is a machine learning model.

36. The method of clauses 34 to 35, wherein the parameterized model comprises a neural network.

37. The method of any of clauses 34 to 36, wherein the parameterized model comprises encoder-decoder architecture.

38. The method of any of clauses 34 to 37, wherein encoder architecture comprises a portion of the parameterized model configured to transform model inputs into the dimensional data in the latent space, and decoder architecture comprises a different portion of the parameterized model configured to transform the dimensional data in the latent space into the output realizations.

39. The method of clause 38, wherein the encoder architecture and the decoder architecture comprise one or more neural networks having one or more layers with one or more nodes.

40. The method of any of clauses 38 to 39, further comprising transforming, with the portion of the parameterized model, higher dimensional data associated with the model inputs into the dimensional data in the latent space, the dimensional data in the latent space comprising lower dimensional data compared to the higher dimensional data associated with the model inputs.

41. The method of any of clauses 38 to 40, wherein the model inputs comprise one or more of an image, a clip, an encoded image, an encoded clip, or data from a prior layer of the parameterized model, associated with a semiconductor manufacturing process.

42. The method of any of clauses 38 to 41, wherein the model inputs are associated with a target pattern design, defects, or process parameters for a semiconductor manufacturing process.

43. The method of any of clauses 34 to 42, wherein the dimensional data in the latent space comprises multi-dimensional vectors associated with model inputs.

44. The method of any of clauses 34 to 43, wherein the multiple output realizations comprise predicted mask images, defect probabilities, or predicted process parameters for a semiconductor manufacturing process.

45. The method of any of clauses 34 to 44, wherein the predicting comprises decoding, with one or more layers and/or one or more nodes of a neural network, a multi-dimensional vector of the dimensional data into an output realization.

46. The method of any of clauses 34 to 45, wherein determining the uncertainty comprises determining a variance of the predicted multiple output realizations.

47. The method of clause 46, wherein determining the variance comprises determining a range, a standard deviation, a maximum, a minimum, an average, a median, and/or a mode of the predicted multiple output realizations.

48. The method of any of clauses 34 to 47, wherein the predicted multiple output realizations comprise images, and wherein determining the uncertainty comprises determining a metric indicative of differences between the images.

49. The method of any of clauses 34 to 48, wherein the given dimensional data and corresponding uncertainties form input output training pairs.

50. The method of clause 49, wherein the parameterized model comprises a neural network, and wherein training the parameterized model with the given dimensional data and the corresponding uncertainties comprises providing the input output training pairs to the neural network so the neural network can learn to predict new output realizations.

51. The method of any of clauses 34 to 50, further comprising determining which portions of the dimensional data in the latent space correspond to predicted output realizations with higher variance compared to other portions of the dimensional data and sampling from the portions that correspond to higher variance.

52. The method of clause 51, wherein determining which portions of the dimensional data in the latent space correspond to predicted output realizations with higher variance facilitates selection of additional training data.

53. The method of any of clauses 34 to 52, further comprising using the trained parameterized model for predicting mask or reticle geometry as part of a semiconductor manufacturing process.

54. The method of any of clauses 34 to 53, further comprising using the trained parameterized model for predicting a continuous tone mask (CTM) as part of a semiconductor manufacturing process.

55. A method for training a parameterized model, the method comprising:

sampling dimensional data in a latent space and for each sample in the latent space:

predicting multiple output realizations to generate a distribution of output realizations for given dimensional data in the latent space; and determining an uncertainty associated with the distribution of the multiple output realizations; and training the parameterized model with the given dimensional data and the determined uncertainty.

56. The method of clause 55, wherein the parameterized model is a machine learning model.

57. The method of clauses 55 to 56, wherein the parameterized model comprises a neural network.

58. The method of any of clauses 55 to 57, wherein the parameterized model comprises encoder-decoder architecture.

59. The method of any of clauses 55 to 58, wherein encoder architecture comprises a portion of the parameterized model configured to transform model inputs into the dimensional data in the latent space, and decoder architecture comprises a different portion of the parameterized model configured to transform the dimensional data in the latent space into the output realizations.

60. The method of clause 59, wherein the encoder architecture and the decoder architecture comprise one or more neural networks having one or more layers with one or more nodes.

61. The method of any of clauses 59 to 60, further comprising transforming, with the portion of the parameterized model, higher dimensional data associated with the model inputs into the dimensional data in the latent space, the dimensional data in the latent space comprising lower dimensional data compared to the higher dimensional data associated with the model inputs.

62. The method of any of clauses 59 to 61, wherein the model inputs comprise one or more of an image, a clip, an encoded image, an encoded clip, or data from a prior layer of the parameterized model, associated with a semiconductor manufacturing process.

63. The method of any of clauses 59 to 62, wherein the model inputs are associated with a target pattern design, defects, or process parameters for a semiconductor manufacturing process.

64. The method of any of clauses 55 to 63, wherein the dimensional data in the latent space comprises multi-dimensional vectors associated with model inputs.

65. The method of any of clauses 55 to 64, wherein the multiple output realizations comprise predicted mask images, defect probabilities, or predicted process parameters for a semiconductor manufacturing process.

66. The method of any of clauses 55 to 65, wherein the predicting comprises decoding, with one or more layers and/or one or more nodes of a neural network, a multi-dimensional vector of the dimensional data into an output realization.

67. The method of any of clauses 55 to 66, wherein determining the uncertainty comprises determining a variance of the predicted multiple output realizations.

68. The method of clause 67, wherein determining the variance comprises determining a range, a standard deviation, a maximum, a minimum, an average, a median, and/or a mode of the predicted multiple output realizations.

69. The method of any of clauses 55 to 68, wherein the predicted multiple output realizations comprise images, and wherein determining the uncertainty comprises determining a metric indicative of differences between the images.

70. The method of any of clauses 55 to 69, wherein the given dimensional data and corresponding uncertainties form input output training pairs.

71. The method of clause 70, wherein the parameterized model comprises a neural network, and wherein training the parameterized model with the given dimensional data and the corresponding uncertainties comprises providing the input output training pairs to the neural network so the neural network can learn to predict new output realizations.

72. The method of any of clauses 55 to 71, further comprising determining which portions of the dimensional data in the latent space correspond to predicted output realizations with higher variance compared to other portions of the dimensional data and sampling from the portions that correspond to higher variance.

73. The method of clause 72, wherein determining which portions of the dimensional data in the latent space correspond to predicted output realizations with higher variance facilitates selection of additional training data.

74. The method of any of clauses 55 to 73, further comprising using the trained parameterized model for predicting mask or reticle geometry as part of a semiconductor manufacturing process.

75. The method of any of clauses 55 to 74, further comprising using the trained parameterized model for predicting a continuous tone mask (CTM) as part of a semiconductor manufacturing process.

76. A non-transitory computer readable media having instructions thereon, the instructions when executed by a computer implementing the method of any of clauses 1 to 75.

77. A method for increasing certainty of parameterized model predictions, the method comprising:

clustering, with a parameterized model, dimensional data in a latent space associated with the parameterized model into clusters, wherein different clusters correspond to different portions of a given input;

predicting, with the parameterized model, an output based on the dimensional data in the latent space;

transforming, with the parameterized model, the dimensional data in the latent space into a recovered version of a given input that corresponds to one or more of the clusters; and adjusting, based on the clusters, the output, and/or the recovered version of the given input, one or more parameters of the parameterized model to increase certainty of the parameterized model predictions.

78. The method of clause 77, further comprising determining which clusters, or parts of clusters, of the dimensional data in the latent space correspond to predicted outputs with higher variance compared to other clusters, or other parts of clusters, of the dimensional data.

79. The method of clause 78, wherein determining which clusters, or parts of clusters, of the dimensional data in the latent space correspond to predicted outputs with higher variance facilitates selection of additional training data.

80. The method of clauses 78 or 79, wherein adjusting comprises making the parameterized model more descriptive by adding to the dimensionality of the latent space, and/or training the parameterized model with more diverse training data associated with one or more of the determined clusters or parts of clusters associated with the higher variance.

81. The method of clause 80, wherein making the parameterized model more descriptive by adding to the dimensionality of the latent space, and/or training the parameterized model with more diverse training data associated with one or more of the determined clusters or parts of clusters associated with the higher variance, comprises:

using more diverse images and more diverse data related to one or more of the clusters, relative to prior training material, as input to train the parameterized model; and/or using more dimensions for encoding vectors, and more encoding layers in the parameterized model.

82. The method of any of clauses 77-81, further comprising training the parameterized model, the training comprising:

sampling the dimensional data in the latent space and for each sample in the latent space:

predicting multiple output realizations to generate a distribution of output realizations for given dimensional data in the latent space; and determining an uncertainty associated with the distribution of the multiple output realizations; and training the parameterized model based on the given dimensional data and the determined uncertainty.

83. The method of clause 82, further comprising determining which clusters of the dimensional data in the latent space correspond to predicted output realizations with higher variance compared to other clusters of the dimensional data and sampling from the clusters that correspond to higher variance.

84. The method of any of clauses 77-83, wherein individual clusters in the latent space correspond to different encoded patterns in the dimensional data.

85. The method of clause 84, wherein adjusting the one or more parameters of the parameterized model comprises determining separate per-pattern information that indicates which pattern types are well known to the parameterized model and result in comparatively consistent predictions, and which pattern types are unfamiliar to the parameterized mode and result in comparatively variable predictions.

86. The method of clause 85, wherein the separate per-pattern information comprises variance, latent space coverage, and/or a distribution.

87. The method of any of clauses 77-86, wherein adjusting the one or more parameters of the parameterized model comprises adjusting a dimensionality of the parameterized model and/or weights of one or more layers of the parameterized model.

88. The method of any of clauses 77-87, further comprising adjusting the parameterized model based on the clusters, the output, and/or the recovered version of the input to decrease a variance of the parameterized model predictions and/or enhance the parameterized model predictions for new patterns.

89. The method of any of clauses 77-88, further comprising:

identifying points of interest in the latent space, wherein the points of interest comprise one or more of points with relatively high variance or uncertainty compared to other points in the latent space, points that are not located within a cluster, or points located at a cartesian distance that is relatively far from one or more other points and/or clusters in the latent space compared to cartesian distances between other points and/or other clusters in the latent space; and using the points of interest, the clusters, the recovered version of the given input, and/or the output to evaluate performance of the parameterized model.

90. The method of any of clauses 77-89, wherein the parameterized model comprises variational encoder-decoder architecture;

wherein the dimensional data in the latent space is encoded by an encoder of the encoder-decoder architecture, the output is predicted based on the dimensional data in the latent space with a decoder of the encoder-decoder architecture, and the dimensional data in the latent space is transformed into the recovered version of the given input by a second decoder of the encoder-decoder architecture; and wherein the method further comprises training the variational encoder-decoder architecture with a probabilistic latent space, which generates realizations in an output space.

91. A non-transitory computer readable media having instructions thereon, the instructions when executed by a computer implementing the method of any of clauses 77-90.

While the concepts disclosed herein may be used for imaging on a substrate such as a silicon wafer, it shall be understood that the disclosed concepts may be used with any type of lithographic imaging systems, e.g., those used for imaging on substrates other than silicon wafers. In addition, the combination and sub-combinations of disclosed elements may comprise separate embodiments. For example, determining the variability of a machine learning model may comprise determining the variability in individual predictions made by the model, and/or the variability in a sampled set of posterior distributions generated by the model. These features may comprise separate embodiments, and/or these features may be used together in the same embodiment.

The descriptions above are intended to be illustrative, not limiting. Thus, it will be apparent to one skilled in the art that modifications may be made as described without departing from the scope of the claims set out below.

What is claimed is:

1. A method for increasing certainty of parameterized model predictions, the method comprising:

clustering, with a parameterized model, dimensional data in a latent space associated with the parameterized model into clusters, wherein different clusters correspond to different portions of a given input;

predicting, with the parameterized model and by a hardware computer system, an output based on the dimensional data in the latent space;

transforming, with the parameterized model, the dimensional data in the latent space into a recovered version of a given input that corresponds to one or more of the clusters; and adjusting, based on the clusters, the output, and/or the recovered version of the given input, one or more parameters of the parameterized model to increase certainty of the parameterized model predictions, the adjusting comprising:

training the parameterized model with more diverse training data different from the prior training data used to train the parameterized model, the more diverse training data comprising images and/or data describing new and/or different features than in the prior training data, images and/or data describing a different portion of a target design or pattern than in the prior training data, and/or images and/or data for different processing conditions than in the prior training data.

2. The method of claim 1, further comprising determining which one or more clusters, or parts of one or more clusters, of the dimensional data in the latent space correspond to predicted outputs with one or more higher variance values compared to that of one or more other clusters, or parts of one or more other clusters, of the dimensional data.

3. The method of claim 2, wherein the determining which one or more clusters, or parts of one or more clusters, of the dimensional data in the latent space correspond to predicted outputs with one or more higher variance values facilitates selection of additional training data in addition to the prior training data used to train the parameterized model.

4. The method of claim 2, wherein the training comprises training the parameterized model with more diverse training data associated with one or more of the one or more determined clusters, or parts of one or more of the one or more determined clusters, associated with predicted outputs with the one or more higher variance values.

5. The method of claim 1, wherein the adjusting comprises the making the parameterized model more descriptive by using more dimensions for encoding vectors and/or more encoding layers in the parameterized model.

6. The method of claim 1, wherein the training comprises:

sampling the dimensional data in the latent space and for each sample in the latent space:

predicting multiple output realizations to generate a distribution of output realizations for given dimensional data in the latent space; and determining an uncertainty associated with the distribution of the multiple output realizations; and training the parameterized model based on the given dimensional data and the determined uncertainty.

7. The method of claim 6, further comprising determining which one or more clusters of the dimensional data in the latent space correspond to predicted output realizations with one or more higher variance values compared to that of one or more other clusters of the dimensional data and sampling from the one or more clusters that correspond to predicted output realizations with one or more higher variance values.

8. The method of claim 1, wherein individual clusters in the latent space correspond to different encoded patterns in the dimensional data.

9. The method of claim 8, wherein the adjusting the one or more parameters of the parameterized model comprises determining separate per-pattern information that indicates which one or more pattern types are well known to the parameterized model, and which one or more pattern types are unfamiliar to the parameterized model.

10. The method of claim 9, wherein the separate per-pattern information comprises variance, latent space coverage, and/or a distribution.

11. The method of claim 1, wherein the adjusting the one or more parameters of the parameterized model comprises adjusting a dimensionality of the parameterized model and/or weights of one or more layers of the parameterized model.

12. The method of claim 1, further comprising adjusting the parameterized model based on the clusters, the output, and/or the recovered version of the input to decrease a variance of the parameterized model predictions and/or enhance the parameterized model predictions for new patterns.

13. The method of claim 1, further comprising:
identifying points of interest in the latent space, wherein the points of interest comprise one or more of points with one or more higher variance or uncertainty values compared to that of other points in the latent space, points that are not located within a cluster, or one or more points located at a cartesian distance that is farther from one or more other points and/or clusters in the latent space compared to cartesian distances between other points and/or other clusters in the latent space; and
using the points of interest, the clusters, the recovered version of the given input, and/or the output to evaluate performance of the parameterized model.

14. The method of claim 1, wherein the parameterized model comprises a variational encoder-decoder architecture;
wherein the dimensional data in the latent space is encoded by an encoder of the encoder-decoder architecture, the output is predicted based on the dimensional data in the latent space with a decoder of the encoder-decoder architecture, and the dimensional data in the latent space is transformed into the recovered version of the given input by a second decoder of the encoder-decoder architecture; and
wherein the method further comprises training the variational encoder-decoder architecture with a probabilistic latent space, which generates realizations in an output space.

15. One or more non-transitory computer-readable media having instructions contained therein, the instructions, when executed by a computer system, configured to cause the computer system to at least:
cluster, with a parameterized model, dimensional data in a latent space associated with the parameterized model into clusters, wherein different clusters correspond to different portions of a given input;

predict, with the parameterized model, an output based on the dimensional data in the latent space;
transform, with the parameterized model, the dimensional data in the latent space into a recovered version of a given input that corresponds to one or more of the clusters; and
adjust, based on the clusters, the output, and/or the recovered version of the given input, one or more parameters of the parameterized model to increase certainty of parameterized model predictions, the adjustment comprising:
training of the parameterized model with more diverse training data different from the prior training data used to train the parameterized model, the more diverse training data comprising images and/or data describing new and/or different features than in the prior training data, images and/or data describing a different portion of a target design or pattern than in the prior training data, and/or images and/or data for different processing conditions than in the prior training data.

16. The one or more computer-readable media of claim 15, wherein the instructions are further configured to cause the computer system to determine which one or more clusters, or parts of one or more clusters, of the dimensional data in the latent space correspond to predicted outputs with one or more higher variance values compared to that of one or more other clusters, or parts of one or more other clusters, of the dimensional data.

17. The one or more computer-readable media of claim 15, wherein the instructions configured to cause the computer system to train the parameterized model are further configured to cause the computer system to:
sample the dimensional data in the latent space and for each sample in the latent space:
predict multiple output realizations to generate a distribution of output realizations for given dimensional data in the latent space; and
determine an uncertainty associated with the distribution of the multiple output realizations; and
train the parameterized model based on the given dimensional data and the determined uncertainty.

18. The one or more computer-readable media of claim 15, wherein individual clusters in the latent space correspond to different encoded patterns in the dimensional data.

19. The one or more computer-readable media of claim 15, wherein the instructions configured to cause the computer system to adjust the one or more parameters of the parameterized model are further configured to cause the computer system to adjust a dimensionality of the parameterized model and/or weights of one or more layers of the parameterized model.

20. The one or more computer-readable media of claim 15, wherein the instructions are further configured to cause the computer system to adjust the parameterized model based on the clusters, the output, and/or the recovered version of the input to decrease a variance of the parameterized model predictions and/or enhance the parameterized model predictions for new patterns.

* * * * *